US012575994B2

(12) United States Patent
Mooney et al.

(10) Patent No.: US 12,575,994 B2
(45) Date of Patent: Mar. 17, 2026

(54) LOWER LIMB EXOSKELETON

(71) Applicant: Dephy, Inc., Maynard, MA (US)

(72) Inventors: Luke Mooney, Westford, MA (US); Jean-François Duval, Belmont, MA (US); Nicholas Benz, Belmont, MA (US); Jonathan Cummings, Concord, MA (US); William Marvin, Canton, MA (US)

(73) Assignee: Dephy, Inc.

( * ) Notice: Subject to any disclaimer, the term of this patent is extended or adjusted under 35 U.S.C. 154(b) by 956 days.

(21) Appl. No.: 17/776,144

(22) PCT Filed: Nov. 10, 2020

(86) PCT No.: PCT/US2020/059866
§ 371 (c)(1),
(2) Date: May 11, 2022

(87) PCT Pub. No.: WO2021/096874
PCT Pub. Date: May 20, 2021

(65) Prior Publication Data

US 2022/0395417 A1 Dec. 15, 2022

Related U.S. Application Data

(60) Provisional application No. 62/985,397, filed on Mar. 5, 2020, provisional application No. 62/934,111, filed on Nov. 12, 2019.

(51) Int. Cl.
*A61H 3/00* (2006.01)
*A61H 1/02* (2006.01)

(52) U.S. Cl.
CPC ............ *A61H 3/00* (2013.01); *A61H 1/0266* (2013.01); *A61H 2003/007* (2013.01);
(Continued)

(58) Field of Classification Search
CPC .. A61H 3/00; A61H 1/0266; A61H 2003/007; A61H 2201/0107;
(Continued)

(56) References Cited

U.S. PATENT DOCUMENTS 2,477,591 A 8/1949 Follis
2,516,872 A * 8/1950 Hauser .................. A61F 5/0127 602/27
(Continued)

FOREIGN PATENT DOCUMENTS

CA 2937610 A1 7/2009
CN 101668447 A * 3/2010 ............... A43B 7/22
(Continued)

OTHER PUBLICATIONS

KR-101104065-B1 Machine Translation (Year: 2025).*
(Continued)

*Primary Examiner* — Kendra D Carter
*Assistant Examiner* — Keira Eileen Callison
(74) *Attorney, Agent, or Firm* — Foley & Lardner LLP

(57) ABSTRACT

An apparatus for an active exoskeleton boot is provided. The apparatus can include a foot plate disposed within a boot of a user. The apparatus can include a first adapter extending from a side surface of the foot plate having a slot and an actuator module comprising a chassis and a post, and the post coupled to the chassis. The apparatus can include a second adapter extending from an end surface of the post. The slot of the first adapter can be configured to engage the second adapter when the actuator module is positioned at a first angle relative to the first adapter. The first adapter can be configured to lock with the second adapter when the actuator module rotates from the first angle to a second angle relative to the first adapter.

20 Claims, 19 Drawing Sheets

(52) U.S. Cl.
CPC ................ *A61H 2201/0107* (2013.01); *A61H 2201/1215* (2013.01); *A61H 2201/164* (2013.01); *A61H 2201/5007* (2013.01); *A61H 2201/5069* (2013.01)

(58) Field of Classification Search
CPC ...... A61H 2201/1215; A61H 2201/164; A61H 2201/5069; A61H 2201/165; A61H 2201/5007; A61H 2201/1642; A61H 2201/5061; A61H 1/0262; A61H 1/0237; A61H 2205/10; A61H 2201/0161; A61F 5/0127; A61F 5/0102; A61F 5/0111; A61F 5/0013; A61F 5/0585; A61F 5/0195; A61F 2005/0132; B25J 9/0006
See application file for complete search history.

(56) References Cited

U.S. PATENT DOCUMENTS 2,573,698 A 11/1951 Ellery
3,064,644 A 11/1962 Patterson
5,014,690 A * 5/1991 Hepburn ............... A61F 5/0127 602/27
5,490,831 A 2/1996 Myers et al.
5,685,830 A 11/1997 Bonutti
6,299,588 B1 10/2001 Fratrick
6,872,187 B1 3/2005 Stark et al.
7,153,242 B2 12/2006 Goffer
7,431,737 B2 10/2008 Ragnarsdottir et al.
7,531,006 B2 5/2009 Clausen et al.
7,628,766 B1 12/2009 Kazerooni et al.
7,811,333 B2 10/2010 Jonsson et al.
8,114,168 B2 2/2012 Olafsson et al.
8,435,309 B2 5/2013 Gilbert et al.
8,516,918 B2 8/2013 Jacobsen et al.
8,585,620 B2 11/2013 Mcbean et al.
8,597,369 B2 12/2013 Hansen et al.
8,734,528 B2 5/2014 Herr et al.
8,764,850 B2 7/2014 Hansen et al.
8,784,350 B2 7/2014 Cohen
8,790,282 B2 7/2014 Jung et al.
8,801,802 B2 8/2014 Oddsson et al.
8,864,846 B2 10/2014 Herr et al.
8,870,801 B2 10/2014 Tomiyama et al.
8,870,967 B2 10/2014 Herr et al.
9,017,419 B1 4/2015 Landry et al.
9,066,819 B2 6/2015 Gramnaes
9,078,774 B2 7/2015 Jonsson et al.
9,198,821 B2 12/2015 Unluhisarcikli et al.
9,333,097 B2 5/2016 Herr et al.
9,339,397 B2 5/2016 Herr et al.
9,345,608 B2 5/2016 Phillips
9,351,900 B2 5/2016 Walsh et al.
9,480,618 B2 11/2016 Hsiao-Wecksler et al.
9,539,117 B2 1/2017 Herr et al.
9,554,922 B2 1/2017 Casler et al.
9,662,262 B2 5/2017 Hollander et al.
9,693,883 B2 7/2017 Herr et al.
9,707,104 B2 7/2017 Clausen
9,737,419 B2 8/2017 Herr et al.
9,808,390 B2 11/2017 Caires et al.
9,839,552 B2 12/2017 Han et al.
9,872,782 B2 1/2018 Herr et al.
9,907,722 B2 3/2018 Aguirre-Ollinger et al.
9,925,071 B2 3/2018 Langlois et al.
9,980,873 B2 5/2018 Tung et al.
10,195,057 B2 2/2019 Clausen
10,251,762 B2 4/2019 Langlois
10,307,271 B2 6/2019 Holgate et al.
10,307,272 B2 6/2019 Herr et al.
10,335,294 B2 7/2019 Huang et al.
10,369,023 B2 8/2019 Simon et al.
10,405,996 B2 9/2019 Langlois
10,406,002 B2 9/2019 Herr et al.
10,426,637 B2 10/2019 Tong et al.
10,463,561 B2 11/2019 Zhang et al.
10,485,681 B2 11/2019 Herr et al.
10,532,000 B1 1/2020 De Sapio et al.
10,537,449 B2 1/2020 Han et al.
10,561,563 B2 2/2020 Herr et al.
10,576,620 B1 3/2020 Chou et al.
11,389,367 B2 7/2022 Mooney et al.
11,413,210 B2 8/2022 Contreras-Vidal et al.
11,752,061 B2 9/2023 Mooney et al.
11,918,536 B2 3/2024 Mooney et al.
2006/0167564 A1 7/2006 Flaherty et al.
2006/0184280 A1 8/2006 Oddsson et al.
2007/0225620 A1 9/2007 Carignan et al.
2009/0030530 A1 1/2009 Martin
2009/0210093 A1 8/2009 Jacobsen et al.
2009/0222105 A1 9/2009 Clausen et al.
2010/0049333 A1 2/2010 Endo et al.
2010/0130894 A1 5/2010 Ikeuchi
2010/0198124 A1 8/2010 Bhugra
2010/0231206 A1 9/2010 Kobayashi
2011/0066088 A1 3/2011 Little et al.
2012/0089063 A1 4/2012 Olson et al.
2012/0256381 A1 10/2012 Bradshaw
2012/0289870 A1 11/2012 Hsiao-Wecksler et al.
2013/0090580 A1 4/2013 Hong et al.
2013/0102934 A1 4/2013 Ikeuchi
2013/0226048 A1 8/2013 Unluhisarcikli et al.
2013/0231595 A1 9/2013 Zoss et al.
2014/0100494 A1 4/2014 Sarkodie-Gyan et al.
2014/0330431 A1 11/2014 Hollander et al.
2015/0141878 A1 5/2015 Roy et al.
2015/0164731 A1 6/2015 Kwak et al.
2015/0173993 A1 6/2015 Walsh et al.
2015/0196403 A1 7/2015 Kim et al.
2015/0257902 A1 9/2015 Martin
2016/0030201 A1 2/2016 Zoss et al.
2016/0107309 A1 4/2016 Walsh et al.
2016/0143800 A1 5/2016 Hyung et al.
2016/0278948 A1 9/2016 Piercy et al.
2016/0331557 A1 11/2016 Tong et al.
2016/0331624 A1 11/2016 Sankai et al.
2017/0043476 A1 2/2017 Seo et al.
2017/0043482 A1 2/2017 Hyun et al.
2017/0119132 A1 5/2017 Pruess et al.
2017/0202724 A1 7/2017 De Rossi et al.
2017/0354529 A1 12/2017 Han et al.
2018/0104075 A1 * 4/2018 Mooney ................. B25J 9/0006
2018/0116826 A1 5/2018 Byars et al.
2018/0125738 A1 5/2018 Witte et al.
2018/0177665 A1 6/2018 Rogozinski
2018/0193172 A1 7/2018 Smith et al.
2018/0200135 A1 7/2018 Tung et al.
2018/0325764 A1 11/2018 Yagi
2019/0011743 A1 1/2019 Yan et al.
2019/0038448 A1 2/2019 Choi et al.
2019/0065970 A1 2/2019 Bonutti et al.
2019/0070060 A1 3/2019 Choi et al.
2019/0083002 A1 3/2019 Jang et al.
2019/0105215 A1 4/2019 Dalley et al.
2019/0105777 A1 4/2019 Dalley et al.
2019/0125004 A1 5/2019 Thomas et al.
2019/0159728 A1 5/2019 Pritchard et al.
2019/0159954 A1 5/2019 Ozsecen et al.
2019/0160321 A1 5/2019 Ozsecen et al.
2019/0175365 A1 6/2019 Herr et al.
2019/0183713 A1 6/2019 Sankai
2019/0254908 A1 8/2019 Ortlieb et al.
2019/0254909 A1 8/2019 Lee et al.
2019/0282429 A1 9/2019 Son et al.
2019/0314185 A1 10/2019 Yuge et al.
2019/0328552 A1 10/2019 Herr et al.
2019/0328604 A1 10/2019 Contreras-Vidal et al.
2019/0343707 A1 11/2019 Riener et al.
2019/0343710 A1 11/2019 Lerner
2019/0344433 A1 11/2019 Lerner
2019/0365554 A1 12/2019 Davies-Sekle
2020/0011406 A1 1/2020 Julin
2020/0016020 A1 1/2020 Mooney et al.

(56) References Cited

U.S. PATENT DOCUMENTS

| | | | |
|---|---|---|---|
| 2020/0018589 | A1 | 1/2020 | Ausserlechner |
| 2020/0085666 | A1 | 3/2020 | Seo et al. |
| 2020/0093679 | A1 | 3/2020 | Sonar et al. |
| 2020/0160020 | A1 | 5/2020 | Cho et al. |
| 2020/0188214 | A1 | 6/2020 | Lee et al. |
| 2020/0188215 | A1 | 6/2020 | Park et al. |
| 2020/0197253 | A1 | 6/2020 | Park et al. |
| 2020/0253772 | A1 | 8/2020 | Reid et al. |
| 2020/0253774 | A1 | 8/2020 | Pismennaya et al. |
| 2020/0276698 | A1 | 9/2020 | Ding et al. |
| 2020/0326780 | A1 | 10/2020 | Kearney et al. |
| 2021/0085554 | A1 | 3/2021 | Roh et al. |
| 2021/0121355 | A1 | 4/2021 | Behboodi et al. |
| 2021/0290470 | A1 | 9/2021 | Farris et al. |
| 2021/0291355 | A1 | 9/2021 | Lerner et al. |
| 2021/0298984 | A1 | 9/2021 | Bulea et al. |
| 2021/0369536 | A1 | 12/2021 | Mooney et al. |
| 2021/0369537 | A1 | 12/2021 | Witte et al. |
| 2021/0370495 | A1 | 12/2021 | Swartz et al. |
| 2021/0393467 | A1 | 12/2021 | Ookoba |
| 2022/0031552 | A1 | 2/2022 | Mooney et al. |
| 2022/0079792 | A1 | 3/2022 | Lear et al. |
| 2022/0110814 | A1 | 4/2022 | Mooney et al. |
| 2022/0273469 | A1 | 9/2022 | Kazerooni et al. |

FOREIGN PATENT DOCUMENTS

| | | | | |
|---|---|---|---|---|
| CN | 202679044 | U | | 1/2013 |
| CN | 105213155 | A | | 1/2016 |
| CN | 103813772 | B | | 7/2016 |
| CN | 104644381 | B | | 8/2016 |
| CN | 104983543 | B | | 8/2016 |
| CN | 107115191 | A | | 9/2017 |
| CN | 107874984 | A | | 4/2018 |
| CN | 105213153 | B | | 6/2018 |
| CN | 105963100 | B | | 7/2018 |
| CN | 108283564 | A | | 7/2018 |
| CN | 108338896 | A | | 7/2018 |
| CN | 108451748 | A | | 8/2018 |
| CN | 106491319 | B | | 12/2018 |
| CN | 105456004 | B | | 2/2019 |
| CN | 109646245 | A | | 4/2019 |
| CN | 209107991 | U | | 7/2019 |
| CN | 209270231 | | | 8/2019 |
| CN | 110327189 | A | | 10/2019 |
| CN | 110478191 | A | | 11/2019 |
| CN | 110575350 | A | | 12/2019 |
| EP | 2 621 413 | B1 | | 6/2014 |
| EP | 2 564 817 | B1 | | 1/2019 |
| IN | 201631013395 | A | | 10/2017 |
| JP | 5935177 | B2 | | 6/2016 |
| KR | 101104065 | B1 | * | 1/2012 |
| KR | 20140107029 | A | | 9/2014 |
| WO | WO-2016/180073 | A1 | | 11/2016 |
| WO | WO-2016/182473 | A1 | | 11/2016 |
| WO | WO-2018/023109 | A1 | | 2/2018 |
| WO | WO-2019/060791 | A1 | | 3/2019 |
| WO | WO-2019/160532 | A1 | | 8/2019 |

OTHER PUBLICATIONS

CN-101668447-A Accessed Oct. 23, 2025 (Year: 2025).*
Dollar et al., "Active Orthoses for the Lower-Limbs: Challenges and State of the Art," IEEE, Jan. 14, 2008, pp. 968-977.
Dollar et al., "Lower Extremity Exoskeletons and Active Orthoses: Challenges and State-of-the-Art," IEEE, Feb. 25, 2008, pp. 144-158.
Goldfarb et al., "Design of a Controlled-Brake Orthosis for FES-aided Gait," IEEE, vol. 4, No. 1, Mar. 1996, pp. 13-24.
Haque et al., "Design and Preliminary Testing of an Instrumented Exoskeleton for Walking Gait Measurement," IEEE, Apr. 12, 2019, 6 pages.
International Preliminary Report on Patentability on PCT Appl. Ser. No. PCT/US2020/059866 dated May 27, 2022 (14 pages).
International Preliminary Report on Patentability on PCT Appl. Ser. No. PCT/US2021/034086 dated Dec. 15, 2022 (10 pages).
International Preliminary Report on Patentability on PCT Appl. Ser. No. PCT/US2021/034163 dated Dec. 15, 2022 (6 pages).
International Preliminary Report on Patentability on PCT Appl. Ser. No. PCT/US2021/034182 dated Dec. 15, 2022 (5 pages).
International Preliminary Report on Patentability on PCT Appl. Ser. No. PCT/US2021/034252 dated Dec. 15, 2022 (14 pages).
International Search Report and the Written Opinion on PCT Appl. Ser. No. PCT/US2021/034163 dated Jun. 25, 2021 (7 pages).
International Search Report and the Written Opinion on PCT Appl. Ser. No. PCT/US2020/059866 dated Feb. 4, 2021 (8 pages).
International Search Report and the Written Opinion on PCT Appl. Ser. No. PCT/US2021/034086 dated Jun. 28, 2021 (11 pages).
International Search Report and the Written Opinion on PCT Appl. Ser. No. PCT/US2021/034182 dated Jun. 29, 2021 (6 pages).
International Search Report and the Written Opinion on PCT Appl. Ser. No. PCT/US2021/034252 dated Jun. 28, 2021 (15 pages).
International Search Report and the Written Opinion on PCT Appl. Ser. No. PCT/US2021/047252 dated Nov. 23, 2021 (10 pages).
International Search Report and the Written Opinion on PCT Appl. Ser. No. PCT/US2021/047295 dated Sep. 23, 2021 (7 pages).
Kim et al., "Mechanical Design of the Hanyang Exoskeleton Assistive Robot (HEXAR)," Dec. 18, 2014, IEEE, pp. 479-484.
Pirjade et al., "Design and Fabrication of a Low-cost Human Body Lower Limb Exoskeleton," IEEE, Apr. 16, 2020, pp. 32-37.
Sanz-Morere et al., "A Knee-Ankle-Foot Orthosis to Assist the Sound Limb of Transfemoral Amputees," IEEE, vol. 1, No. 1, Feb. 13, 2019, pp. 38-48.
US Final Office Action on U.S. Appl. No. 17/028,761 dated Mar. 16, 2021 (18 pages).
US Final Office Action on U.S. Appl. No. 17/136,333 dated Jun. 21, 2021 (27 pages).
US Non-Final Office Action on U.S. Appl. No. 17/022,982 dated May 4, 2021 (19 pages).
US Non-Final Office Action on U.S. Appl. No. 17/028,761 dated Nov. 23, 2020 (18 pages).
US Non-Final Office Action on U.S. Appl. No. 17/028,761 dated Oct. 12, 2021 (24 pages).
US Non-Final Office Action on U.S. Appl. No. 17/136,333 dated Mar. 12, 2021 (24 pages).
US Non-Final Office Action on U.S. Appl. No. 17/136,333 dated Nov. 23, 2021 (28 pages).
US Non-Final Office Action on U.S. Appl. No. 17/504,261 dated Dec. 20, 2022 (9 pages).
US Non-Final Office Action on U.S. Appl. No. 17/526,454 dated Jan. 12, 2023 (22 pages).
US Notice of Allowance on U.S. Appl. No. 17/022,982 dated Jan. 29, 2021 (12 pages).
US Notice of Allowance on U.S. Appl. No. 17/022,982 dated Sep. 27, 2021 (9 pages).
US Notice of Allowance on U.S. Appl. No. 17/028,761 dated Feb. 2, 2022 (10 pages).
US Notice of Allowance on U.S. Appl. No. 17/084,111 dated Feb. 19, 2021 (13 pages).
US Notice of Allowance on U.S. Appl. No. 17/084,111 dated May 20, 2021 (8 pages).
US Notice of Allowance on U.S. Appl. No. 17/084,111 dated Sep. 16, 2021 (7 pages).
US Notice of Allowance on U.S. Appl. No. 17/109,911 dated Feb. 3, 2021 (10 pages).
US Notice of Allowance on U.S. Appl. No. 17/109,911 dated May 25, 2021 (5 pages).
US Notice of Allowance on U.S. Appl. No. 17/109,911 dated Sep. 14, 2021 (5 pages).
US Notice of Allowance on U.S. Appl. No. 17/136,333 dated Apr. 6, 2022 (13 pages).
Witte et al., "Design of Two Lightweight, High-Bandwidth Torque-Controlled Ankle Exoskeletons," IEEE International Conference on Robotics and Automation (ICRA), May 26, 2015 (6 pages).
Xie et al., "An Unpowered Flexible Lower Limb Exoskeleton: Walking Assisting and Energy Harvesting," IEEE, vol. 24, No. 5, Oct. 5, 2019, pp. 2236-2247.

(56) References Cited

OTHER PUBLICATIONS

Zhang et al., "Experimental comparison of torque control methods on an ankle exoskeleton during human walking," IEEE International Conference on Robotics and Automation (ICRA), May 26, 2015 (6 pages).
Zhou et al., "Preliminary Evaluation of Gait Assistance During Treadmill Walking with a Light-weight Bionic Knee Exoskeleton," IEEE, Dec. 7, 2016, pp. 1173-1178.
US Non-Final Office Action on U.S. Appl. No. 17/867,162 dated Apr. 12, 2023 (32 pages).
European Extended Search Report issued in corresponding European Patent Application No. 21817832.5 dated May 29, 2024 (10 pages).
European Extended Search Report issued in corresponding European Patent Application No. 21818627.8 dated May 15, 2024.
Final Office Action on U.S. Appl. No. 17/002,556 Dtd Feb. 1, 2024.
Notice of Allowance on U.S. Appl. No. 17/002,556 Dtd May 15, 2024.
Partial Supplementary European Search Report issued in corresponding European Patent Application No. 21817291.4 dated May 23, 2024 (11 pages).
US Non-Final Office Action on U.S. Appl. No. 18/238,612 dated Jun. 3, 2024.
US Notice of Allowance on U.S. Appl. No. 17/504,248 dated Nov. 28, 2023 (9 pages).
US Notice of Allowance on U.S. Appl. No. 17/867,162 dated Oct. 30, 2023 (18 pages).
US Corrected Notice of Allowance on U.S. Appl. No. 17/504,261 dated Apr. 24, 2023 (2 pages).
US Notice of Allowance on U.S. Appl. No. 17/526,454 dated Apr. 26, 2023 (8 pages).
International Preliminary Report on Patentability on PCT Appl. Ser. No. PCT/US2021/047295 dated Mar. 30, 2023 (5 pages).
US Final Office Action on U.S. Appl. No. 17/526,454 dated Apr. 7, 2023 (6 pages).
US Notice of Allowance on U.S. Appl. No. 17/504,261 dated Apr. 7, 2023 (9 pages).
US Non-Final Office Action on U.S. Appl. No. 17/717,347 dated Sep. 19, 2024 (23 pages).
US Non-Final Office Action on U.S. Appl. No. 18/594,930 dated Nov. 7, 2024 (78 pages).
US Notice of Allowance on U.S. Appl. No. 18/244,802 dated Dec. 5, 2024.
European Extended Search Report issued in corresponding European Patent Application No. 21817826.7 dated Jun. 14, 2024 (6 pages).
Office Action issued in corresponding European Patent Application No. 21817291.4 dated Aug. 13, 2024 (10 pages).
Office Action issued in corresponding European Patent Application No. 21862525.9 dated Aug. 26, 2024 (5 pages).
Office Action issued in corresponding European Patent Application No. 21869964.3 dated Aug. 13, 2024 (5 pages).
US Non-Final Office Action on U.S. Appl. No. 18/244,802 dated Aug. 7, 2024 (9 pages).
US Notice of Allowance on U.S. Appl. No. 18/238,612 dated Sep. 11, 2024.
Weerasingha et al., "C-JAE: 3 DOF Robotic Ankle Exoskeleton with Compatible Joint Axes", IEEE, 2018, p. 270-275.
International Preliminary Report on Patentability on PCT Appl. Ser. No. PCT/US2021/047252 dated Mar. 9, 2023 (9 pages).
EP Office Action on EP Appl. Ser. No. 20888375.1 dated Sep. 14, 2023 (7 pages).
US Corrected Notice of Allowance on U.S. Appl. No. 17/504,261 dated May 18, 2023 (2 pages).
US Non-Final Office Action on U.S. Appl. No. 17/002,556 dated Aug. 21, 2023 (107 pages).
US Non-Final Office Action on U.S. Appl. No. 17/504,248 dated Jun. 7, 2023 (12 pages).
US Notice of Allowance on U.S. Appl. No. 17/867,162 dated Aug. 30, 2023 (17 pages).
US Notice of Allowance on U.S. Appl. No. 17/867,162 dated Oct. 5, 2023 (18 pages).
US Non-Final Office Action on U.S. Appl. No. 17/717,347 dated Jan. 28, 2025.
US Notice of Allowance on U.S. Appl. No. 18/244,802 dated Feb. 4, 2025.
US Notice of Allowance on U.S. Appl. No. 17/717,347 dated Jun. 6, 2025.
Office Action issued in corresponding European Patent Application No. 20888375.1 dated Apr. 17, 2025.
US Notice of Allowance on U.S. Appl. No. 18/594,930 dated Apr. 30, 2025.
US Non-Final Office Action on U.S. Appl. No. 18/827,085 dated Nov. 28, 2025.

* cited by examiner

LOWER LIMB EXOSKELETON

CROSS-REFERENCE TO RELATED APPLICATIONS

This application is a national stage entry pursuant to 35 U.S.C. § 371 of International Patent Application No. PCT/US2020/059866, filed Nov. 10, 2020 and designating the United States, which claims the benefit of priority under 35 U.S.C. § 119 to U.S. Provisional Patent Application 62/985,397, filed on Mar. 5, 2020 and U.S. Provisional Patent Application 62/934,111 filed on Nov. 12, 2019, each of which is hereby incorporated by reference herein its entirety.

BACKGROUND

Exoskeletons can be worn by a user to facilitate movement of limbs of the user.

SUMMARY

This technical solution is directed to lower limb exoskeleton. In particular, this technical solution is directed to attaching or detaching an exoskeleton with a shin pad to a boot worn by a user without using any external tools or devices. For example, the boot can include a footplate within the boot. The footplate can include a first structure (e.g., slot or attachment point) that is at least partially exposed from within the boot. The exoskeleton can include a second structure. Prior to the shin pad engaging the shin of the user, the second structure on the exoskeleton can be inserted into the slot on the first structure of the footplate. The second structure can then be rotated or otherwise exert force so as to lock into the first structure. The force exerted by the exoskeleton onto the first structure and the second structure can reinforce the engagement. Thus, the exoskeleton can be attached or detached when the shin pad is not attached to the user and without the use of any external tools or devices in a manner that reinforces the engagement.

At least one aspect of the present disclosure is directed to an apparatus for an active exoskeleton boot. The apparatus can include a foot plate disposed within a boot of a user. The apparatus can include a first adapter extending from a side surface of the foot plate within the boot to an external portion of the boot. The first adapter can include a slot exposed towards the external portion. The apparatus can include a shin pad to be coupled to a shin of a user and at least one housing of one or more housings. The apparatus can include an actuator module comprising a chassis and a post. The chassis can be coupled to the shin pad through a housing of the one or more housings and the post can be post coupled to the chassis. A second adapter can extend from an end surface of the post. The slot of the first adapter can be configured to receive the second adapter of the actuator module upon insertion of the second adaptor into the slot at a first angle relative to the first adapter. The slot of the first adapter can be configured to lock the second adaptor upon rotation of the first adaptor from the first angle to the second angle relative to the first adaptor to cause the actuator model to generate torque about an axis of rotation of an ankle joint of the user.

In embodiments, the actuator module can provide a force at a first level to the first adapter and the second adapter when the actuator module is positioned at the first angle relative to the first adapter and the actuator module provides a force at a second level to the first adapter and the second adapter when the actuator module is positioned at the second angle relative to the first adapter, the second level different from the first level. The first adapter and the second adapter can form a keyed joint when the actuator module is positioned at the second angle relative to the first adapter. The apparatus can include the slot of the first adapter having a first portion having a first shape. The first shape can be the same shape as a shape of the second adapter. The apparatus can include the slot of the first adapter having a second portion having a second shape that is different from the first shape of the first portion.

In embodiments, the slot of the first adapter can include a first portion having a first set of dimensions and the slot of the first adapter can include a second portion having a second set of dimensions, the second set of dimensions different from the first set of dimensions. The apparatus can include a support plate coupling the first adapter to the foot plate through one or more fasteners. The apparatus can include a shin lever extending from the at least one housing to the shin pad to connect the shin pad to the chassis. The foot plate can include a carbon structure disposed within a sole of the boot of the user.

In embodiments, the one or more housings can enclose electronic circuitry and an electric motor that generate torque about an axis of rotation of an ankle joint of the user. A battery holder can be coupled to the shin pad, the battery holder located above the one or more housings enclosing the electronic circuitry. A battery module can be held in the battery holder. The battery module can include a first power connector that electrically couples to a second power connector located in the battery holder to provide electric power to the electronic circuitry and the electric motor. An output shaft can be coupled to the electric motor and extending through a bore in a second housing of the one or more housings enclosing the electric motor. In embodiments, the electronic circuitry can control delivery of power from the battery module to the electric motor to generate torque about the axis of rotation of the ankle joint of the user.

The apparatus can include a first rotary encoder enclosed within the one or more housings to measure an angle of the electric motor. In embodiments, the electronic circuitry can receive, from the first rotary encoder, an indication of the angle of the electric motor and controls, based on the indication of the angle of the electric motor, operation of the electric motor to generate torque about the axis of rotation of the ankle joint of the user. The apparatus can include a second rotary encoder to measure an angle of the ankle joint. The second rotary encoder can include a first component enclosed in the one or more housings and in communication with the electronic circuitry, and a second component located outside the one or more housings and configured to interact with the first component. The first component of the second rotary encoder can include a sensor. The second component of the second rotary encoder can include a magnetic component. The electronic circuitry can determine the angle of the ankle joint based on an interaction between the sensor and the magnetic component.

In at least one aspect, a method for connecting an active exoskeleton boot to a user is provided. The method can include disposing a foot plate within a boot of a user. The method can include connecting a first adapter to a side surface of the foot plate within the boot extending from an external portion of the boot. The first adapter can include a slot exposed towards the external portion. The method can include providing a shin pad to be coupled to a shin of a user and at least one housing of one or more housings. The method can include forming a second adapter from an end surface of a post. The method can include connecting a chassis to the post to form an actuator module. In embodiments, the slot of the first adapter can be configured to receive the second adapter of the actuator module upon insertion of the second adaptor into the slot at a first angle relative to the first adapter. The slot of the first adapter can be configured to lock the second adaptor upon rotation of the first adaptor from the first angle to the second angle relative to the first adaptor to cause the actuator model to generate torque about an axis of rotation of an ankle joint of the user.

In embodiments, the method can include providing, by the actuator module, a force at a first level to the first adapter and the second adapter when the actuator module is positioned at the first angle relative to the first adapter. The method can include providing, by the actuator module responsive to the rotation, a force at a second level to the first adapter and the second adapter when the actuator module is positioned at the second angle relative to the first adapter, the second level different from the first level. The method can include forming a keyed joint between the first adapter and the second adapter when the actuator module is positioned at the second angle relative to the first adapter.

The method can include forming a first portion of the slot of the first adapter having a first shape, the first shape the same shape as a shape of the second adapter. The method can include forming a second portion of the slot of the first adapter having a second shape, different from the first shape of the first portion. The method can include forming a first portion of the slot of the first adapter having a first set of dimensions. The method can include forming a second portion of the slot of the first adapter having a second set of dimensions, the second set of dimensions different from the first set of dimensions. The method can include coupling, through a support plate, the first adapter to the foot plate through one or more fasteners. The method can include connecting, through a shin lever, the shin pad to the chassis, the shin lever extending from the at least one housing to the shin pad.

In embodiments, the method can include enclosing electronic circuitry and an electric motor within the one or more housings. The electronic circuitry and the electric motor can generate torque about an axis of rotation of an ankle joint of the user. The method can include coupling a battery holder to the shin pad, the battery holder located above the one or more housings enclosing the electronic circuitry. The method can include disposing a battery module in the battery holder. The battery module can include a first power connector that electrically couples to a second power connector located in the battery holder to provide electric power to the electronic circuitry and the electric motor. The method can include coupling an output shaft to the electric motor. The output shaft can extend through a bore in a second housing of the one or more housings enclosing the electric motor. In embodiments, the electronic circuitry can control delivery of power from the battery module to the electric motor to generate torque about the axis of rotation of the ankle joint of the user.

The method can include enclosing a rotary encoder within the one or more housings to measure an angle of the electric motor. In embodiments, the electronic circuitry can receive, from the rotary encoder, an indication of the angle of the electric motor and controls, based on the indication of the angle of the electric motor, operation of the electric motor to generate torque about the axis of rotation of the ankle joint of the user.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

This disclosure relates generally to performance enhancing wearable technologies. Particularly, this disclosure relates to apparatus, systems and methods for wearable exoskeletons that can implement features for quick disconnect operation (e.g., lower limb exoskeleton, knee exoskeleton, back exoskeleton, etc.)

Exoskeletons (e.g., battery-powered active exoskeleton, battery-powered active exoskeleton boot, lower limb exoskeleton, knee exoskeleton, or back exoskeleton) can include devices worn by a person to augment physical abilities. Exoskeletons can be considered passive (e.g., not requiring an energy source such as a battery) or active (e.g., requiring an energy source to power electronics and usually one or many actuators). Exoskeletons may be capable of providing large amounts of force, torque and/or power to the human body in order to assist with motion.

Exoskeletons can transfer energy to the user or human. Exoskeletons may not interfere with the natural range of motion of the body. For example, exoskeletons can allow a user to perform actions (e.g., walking, running, reaching, or jumping) without hindering or increasing the difficulty of performing these actions. Exoskeletons can reduce the difficulty of performing these actions by reducing the energy or effort the user would otherwise exert to perform these actions. Exoskeletons can convert the energy into useful mechanical force, torque, or power. Onboard electronics (e.g., controllers) can control the exoskeleton. Output force and torque sensors can also be used to make controlling easier.

Figure 1:
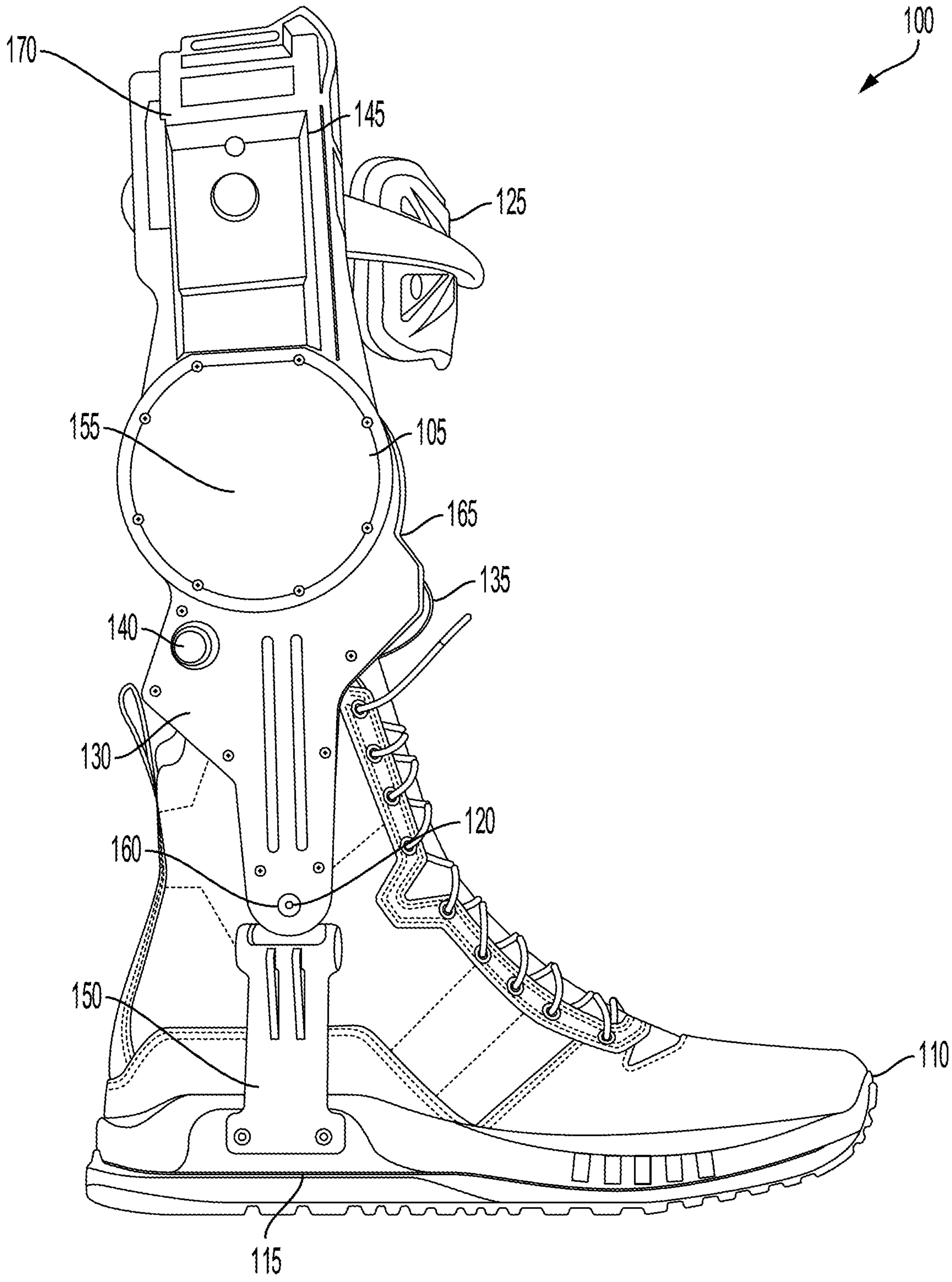
FIG. 1 illustrates a schematic diagram of a lower limb exoskeleton in accordance with an illustrative embodiment.

FIG. 1 illustrates a schematic diagram of an exoskeleton 100. The exoskeleton 100 can be referred to as a lower limb exoskeleton, lower limb exoskeleton assembly, lower limb exoskeleton system, ankle exoskeleton, ankle foot orthosis, knee exoskeleton, hip exoskeleton, exoskeleton boot, or exoboot. The exoskeleton 100 can include a water resistant active exoskeleton boot. For example, the exoskeleton 100 can resist the penetration of water into the interior of the exoskeleton 100. The exoskeleton 100 can include a water resistant active exoskeleton boot. For example, the exoskeleton 100 can be impervious to liquids (e.g., water) and non-liquids (e.g., dust, dirt, mud, sand, or debris). The exoskeleton 100 can remain unaffected by water or resist the ingress of water, such as by decreasing a rate of water flow into the interior of the exoskeleton 100 to be less than a target rate indicative of being water resistant or waterproof. For example, the exoskeleton 100 can operate in 3 feet of water for a duration of 60 minutes. The exoskeleton 100 can have an ingress protection rating (IP) rating of 68. The exoskeleton 100 can have a National Electrical Manufacturer Association (NEMA) rating of 4X, which can indicate that the exoskeleton 100 has a degree of protection with respect to harmful effects on the equipment due to the ingress of water (e.g., rain, sleet, snow, splashing water, and hose directed water), and that the exoskeleton can be undamaged by the external formation of ice on the enclosure.

The exoskeleton 100 can include a shin pad 125 (e.g., shin guard). The shin pad 125 can be coupled to a shin of a user below a knee of the user. The shin pad 125 can be coupled to the shin of the user to provide support. The shin pad 125 can include a piece of equipment to protect the user from injury. For example, the shin pad 125 can protect the lower extremities of the user from external impact. The shin pad 125 can interface with the shin of the user. The shin pad 125 can include a strap or a band (e.g., adjustable band) configured to wrap around the shin of the user. The shin pad 125 can secure the upper portion of the exoskeleton 100 to the body of the user through the strap or band. The shin pad 125 can secure or help secure the exoskeleton 100 to the shin, leg, or lower limb of the user. The shin pad 125 can provide structural integrity to the exoskeleton 100. The shin pad 125 can support other components of the exoskeleton 100 that can be coupled to the shin pad 125. The shin pad 125 can be made of lightweight, sturdy, and/or water resistant materials. For example, the shin pad 125 can be made of plastics, aluminum, fiberglass, foam rubber, polyurethane, and/or carbon fiber.

The exoskeleton 100 can include one or more housings 105. At least one of the one or more housings 105 can be coupled to the shin pad 125 below the knee of the user. The shin pad 125 can be coupled to the at least one housing 105 via a shin lever. The shin lever can extend from the at least one housing 105 to the shin pad 125. The shin lever can include a mechanical structure that connects the shin pad 125 to a chassis. The chassis can include a mechanical structure that connects static components. The one or more housings 105 can enclose electronic circuitry. The one or more housings 105 can encapsulate some or all the electronics of the exoskeleton 100. The one or more housings 105 can include an electronics cover (e.g., case). The one or more housings 105 can enclose an electric motor. The electric motor can generate torque about an axis of rotation of an ankle joint of the user. The ankle joint can allow for dorsiflexion and/or plantarflexion of the user's foot. The exoskeleton 100 can include an ankle joint component 120 that rotates about the axis of rotation the ankle joint. The ankle joint component 120 can be positioned around or adjacent to the ankle joint.

The exoskeleton 100 can include a rotary encoder 155 (e.g., shaft encoder, first rotary encoder, or motor encoder). The rotary encoder 155 can be enclosed within the one or more housings 105. The rotary encoder 155 can measure an angle of the electric motor. The angle of the electric motor can be used by the controller to determine an amount of torque applied by the exoskeleton 100. For example, the angle of the electric motor can correspond to an amount of torque applied by the exoskeleton 100. An absolute angle of the electric motor can correspond to an amount of torque applied by the exoskeleton 100. The rotary encoder 155 can include an inductive encoder. The ankle joint component 120 can be actuated by a motor (e.g., electric motor). The rotary encoder 155 can include a contactless magnetic encoder or an optical encoder.

The exoskeleton 100 can include a second rotary encoder 160 (e.g., ankle encoder). The second rotary encoder 160 can measure an angle of the ankle joint. The angle of the ankle joint can be used by the controller to determine an amount of torque applied by the exoskeleton 100. The second rotary encoder 160 can include a first component enclosed in the one or more housings 105 and in communication with the electronic circuitry. The second rotary encoder 160 can include a second component located outside the one or more housings 105 and configured to interact with the first component. The second rotary encoder 160 can include a contactless magnetic encoder, a contactless inductive encoder, or an optical encoder. The second rotary encoder 160 can detect the angle of the ankle joint while the rotary encoder 155 can detect the angle of the electric motor. The angle of the electric motor can be different from the angle of the ankle joint. The angle of the electric motor can be independent of the angle of the ankle joint. The angle of the ankle joint can be used to determine an output (e.g., torque) of the electric motor. The ankle joint component 120 can be coupled to the second rotary encoder 160.

The one or more housings 105 can encapsulate electronics that are part of the exoskeleton 100. The one or more housings 105 can form a fitted structure (e.g., clamshell structure) to enclose the electronic circuitry and the electric motor. The fitted structure can be formed from two or more individual components. The individual components of the fitted structure can be joined together to form a single unit. The one or more housings 105 can be formed of plastic or metal (e.g., aluminum). An adhesive sealant can be placed between individual components of the fitted structure and under the electronics cover. A gasket can be placed between individual components of the fitted structure and under the electronics cover. The gasket can be placed in the seam between the individual components of the fitted structure.

A sealant 165 can be placed in contact with the one or more housings 105 to close the one or more housings 105 and prevent an ingress of water into the one or more housings 105. The sealant 165 used to close the one or more housings 105 can include an adhesive sealant (e.g., super glue, epoxy resin, or polyvinyl acetate). The adhesive sealant can include a substance used to block the passage of fluids through the surface or joints of the one or more housings 105. The sealant 165 used to close the one or more housings 105 can include epoxy. The sealant 165 can permanently seal or close the one or more housings 105. For example, the sealant 165 can seal or close the one or more housings 105 such that the one or more housings 105 are not removably attached to one another.

The exoskeleton 100 can couple with a boot 110. For example, the exoskeleton 100 can be attached to the boot 110. The boot 110 can be worn by the user. The boot 110 can be connected to the exoskeleton 100. The exoskeleton 100 can be compatible with different boot shapes and sizes. The boot 110 as discussed herein can include or refer to a shoe, sneaker and/or any kind of footwear worn by a user. The exoskeleton 100 can include an actuator 130 (e.g., actuator lever arm, or actuator module). The actuator 130 can include one or more of the components in the exoskeleton 100. For example, the actuator 130 can include the one or more housings 105, the footplate 115, the ankle joint component 120, the actuator belt 135, and the post 150, while excluding the boot 110. The boot 110 can couple the user to the actuator 130. The actuator 130 can provide torque to the ground and the user.

The exoskeleton 100 can include a footplate 115 (e.g., carbon insert, carbon shank). The footplate 115 can include a carbon fiber structure located inside of the sole of the boot 110. The footplate 115 can be made of a carbon-fiber composite. The footplate 115 can be inserted into the sole of the boot 110. The footplate 115 can be used to transmit torque from the actuator 130 to the ground and to the user. The footplate 115 can be located in the sole of the exoskeleton 100. This footplate 115 can have attachment points that allow for the connection of the exoskeleton's mechanical structure. An aluminum insert with tapped holes and cylindrical bosses can be bonded into the footplate 115. This can create a rigid mechanical connection to the largely compliant boot structure. The bosses provide a structure that can be used for alignment. The footplate 115 can be sandwiched between two structures, thereby reducing the stress concentration on the part. This design can allow the boot to function as a normal boot when there is no actuator 130 attached.

The exoskeleton 100 can include an actuator belt 135 (e.g., belt drivetrain). The actuator belt 135 can include a shaft that is driven by the motor and winds the actuator belt 135 around itself. The actuator belt 135 can include a tensile member that is pulled by the spool shaft and applies a force to the ankle lever. Tension in the actuator belt 135 can apply a force to the ankle lever. The exoskeleton 100 can include an ankle lever. The ankle lever can include a lever used to transmit torque to the ankle. The exoskeleton 100 can be used to augment the ankle joint.

The exoskeleton 100 can include a power button 140 (e.g., switch, power switch). The power button 140 can power the electronics of the exoskeleton 100. The power button 140 can be located on the exterior of the exoskeleton 100. The power button 140 can be coupled to the electronics in the interior of the exoskeleton 100. The power button 140 can be electrically connected to an electronic circuit. The power button 140 can include a switch configured to open or close the electronic circuit. The power button 140 can include a low-power, momentary push-button configured to send power to a microcontroller. The microcontroller can control an electronic switch.

The exoskeleton 100 can include a battery holder 170 (e.g., charging station, dock). The battery holder 170 can be coupled to the shin pad 125. The battery holder 170 can be located below the knee of the user. The battery holder 170 can be located above the one or more housings 105 enclosing the electronic circuitry. The exoskeleton 100 can include a battery module 145 (e.g., battery). The battery holder 170 can include a cavity configured to receive the battery module 145. A coefficient of friction between the battery module 145 and the battery holder 170 can be established such that the battery module 145 is affixed to the battery holder 170 due to a force of friction based on the coefficient of friction and a force of gravity. The battery module 145 can be affixed to the battery holder 170 absent a mechanical button or mechanical latch. The battery module 145 can be affixed to the battery holder 170 via a lock, screw, or toggle clamp. The battery holder 170 and the battery module 145 can be an integrated component (e.g., integrated battery). The integrated battery can be supported by a frame of the exoskeleton 100 as opposed to having a separated enclosure. The integrated battery can include a charging port. For example, the charging port can include a barrel connector or a bullet connector. The integrated battery can include cylindrical cells or prismatic cells.

The battery module 145 can power the exoskeleton 100. The battery module 145 can include one or more electrochemical cells. The battery module 145 can supply electric power to the exoskeleton 100. The battery module 145 can include a power source (e.g., onboard power source). The power source can be used to power electronics and one or more actuators. The battery module 145 can include a battery pack. The battery pack can be coupled to the one or more housings 105 below a knee of the user. The battery pack can include an integrated battery pack. The integrated battery pack can remove the need for power cables, which can reduce the snag hazards of the system. The integrated battery pack can allow the system to be a standalone unit mounted to the user's lower limb. The battery module 145 can include a battery management system to perform various operations. For example, the system can optimize the energy density of the unit, optimize the longevity of the cells, and enforce safety protocols to protect the user.

The battery module 145 can include a removable battery. The battery module 145 can be referred to as a local battery because it is located on the exoboot 100 (e.g., on the lower limb or below the knee of the user), as opposed to located on a waist or back of the user. The battery module 145 can include a weight-mounted battery, which can refer to the battery being held in place on the exoboots 100 via gravity and friction, as opposed to a latching mechanism. The battery module 145 can include a water resistant battery or a waterproof battery. The exoskeleton 100 and the battery module 145 can include water resistant connectors.

The battery module 145 can include a high-side switch (e.g., positive can be interrupted). The battery module 145 can include a ground that is always connected. The battery module 145 can include light emitting diodes (LEDs). For example, the battery module 145 can include three LEDs used for a user interface. The LEDs can be visible from one lens so that the LEDs appear as one multicolor LED. The LEDs can blink in various patterns and/or colors to communicate a state of the battery module 145 (e.g., fully charged, partially charged, low battery, or error).

The exoskeleton 100 can include a post 150. The post 150 can include a mechanical structure that connects to the boot 110. The post 150 can couple the ankle joint component 120 with the footplate 115. The post 150 can be attached at a first end to the footplate 115. The post 150 can be attached at a second end to the ankle joint component 120. The post 150 can pivot about the ankle joint component 120. The post 150 can include a mechanical structure that couples the footplate 115 with the ankle joint component 120. The post 150 can include a rigid structure. The post 150 can be removably attached to the footplate 115. The post 150 can be removably attached to the ankle joint component 120. For example, the post 150 can be disconnected from the ankle joint component 120. The exoskeleton 100 can include a rugged system used for field testing. The exoskeleton 100 can include an integrated ankle lever guard (e.g., nested lever). The exoskeleton 100 can include a mechanical shield to guard the actuator belt 135 and ankle lever transmission from the environment. The housing structure of the system can extend to outline the range of travel of the ankle lever on the lateral and medial side.

Exoskeletons 100 can transform an energy source into mechanical forces that augment human physical ability. Exoskeletons 100 can have unique power requirements. For example, exoskeletons 100 can use non-constant power levels, such as cyclical power levels with periods of high power (e.g., 100 to 1000 Watts) and periods of low or negative power (e.g., 0 Watts). Peaks in power can occur once per gait cycle. Batteries configured to provide power to the exoskeleton 100 can be the source of various issues. For example, batteries located near the waist of a user can require exposed cables that extend from the battery to the lower limb exoskeleton. These cables can introduce snag hazards, make the device cumbersome, and add mass to the system. Additionally, long cables with high peak power can result in excess radio emissions and higher voltage drops during high current peaks. Thus, systems, methods and apparatus of the present technical solution provide an exoskeleton with a local battery that can perform as desired without causing snag hazards, power losses, and radio interference. Additionally, the battery can be located close to the knee such that the mass felt by the user is reduced as compared to a battery located close the foot of the user.

In embodiments, the battery module 145 can be inserted into the exoskeleton 100. The battery module 145 can include a sealed battery. The battery module 145 can coupled with the exoskeleton 100 via a waterproof or water resistant connection. The battery module 145 can connect locally (e.g., proximate) to the exoskeleton 100 such that a wire is not needed to run from the battery module 145 to the electronics. The battery module 145 can be removably affixed to the battery holder 170. For example, the battery module 145 can slide in and out of the battery holder 170. By removably affixing the battery module 145 to the battery holder 170, the battery module 145 can be replaced with another battery module 145, or the battery module 145 can be removed for charging. The battery module 145 can include a first power connector that electrically couples to a second power connector located in the battery holder 170 while attached to the battery holder 170 to provide electric power to the electronic circuitry and the electric motor. The first power connector and the second power connector can couple (e.g., connect) the battery module 145 with the electronic circuitry. The first power connector and the second power connector can couple the battery module 145 with the one or more housings 105. The first power connector can be recessed in the battery module 145 to protect the first power connector from loading and impacts. The first power connector and the second power connector can include wires (e.g., two wires, three wires, or four wires). The battery module 145 can communicate with the electronic circuitry via the first power connector and the second power connector. The first power connector and the second power connector can include an exposed connector.

The geometry of the battery module 145 can allow for storage and packing efficiency. The battery module 145 can include a gripping element to allow for ergonomic ease of removal and insertion of the battery module 145 into the battery holder 170. The battery module 145 can be made of lightweight plastics or metals. The battery module 145 can be made of heat insulating materials to prevent heat generated by the battery cells from reaching the user. One or more faces of the battery module 145 can be made of metal to dissipate heat.

The exoskeleton 100 can communicate with the battery module 145 during operation. The exoskeleton 100 can use battery management system information to determine when safety measures will trigger. For example, during a high current peak (e.g., 15 A) or when the temperature is near a threshold, the power output can be turned off. The exoskeleton 100 can temporarily increase safety limits for very specific use cases (e.g., specific environmental conditions, battery life). The battery module 145 can prevent the exoskeleton 100 from shutting down by going into a low power mode and conserving power. The exoskeleton 100 can put the battery module 145 in ship mode if a major error is detected and the exoskeleton 100 wants to prevent the user from power cycling. The battery management system can be adapted to support more or less series cells, parallel cells, larger capacity cells, cylindrical cells, different lithium chemistries, etc.

Figure 2:
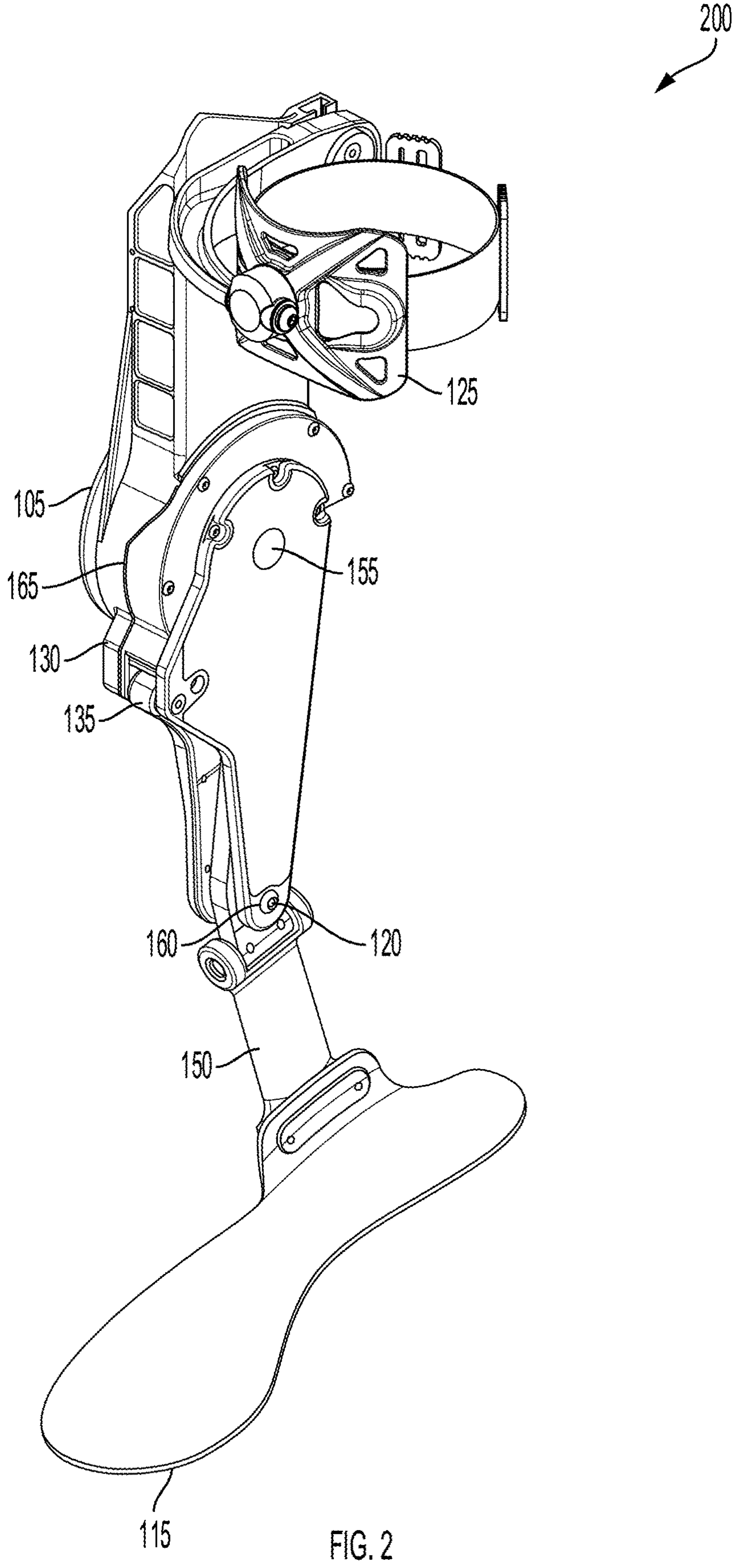
FIG. 2 illustrates a schematic diagram of a lower limb exoskeleton in accordance with an illustrative embodiment.

FIG. 2 illustrates a schematic diagram 200 of the exoskeleton 100. The exoskeleton 100 can include the one or more housings 105, the footplate 115, the ankle joint component 120, shin pad 125, the actuator 130, the actuator belt 135, the post 150, the rotary encoder 155, the second rotary encoder 160, and the sealant 165 as described above. The one or more housings 105 can be coupled to the shin pad 125. The post 150 can couple the ankle joint component 120 with the footplate 115. The actuator 130 can include the one or more housings 105, the footplate 115, the ankle joint component 120, the actuator belt 135, and the post 150. The rotary encoder 155 can measure an angle of the electric motor. The second rotary encoder 160 can measure an angle of the ankle joint. The sealant 165 can be placed in contact with the one or more housings 105 to close the one or more housings 105 and prevent an ingress of water into the one or more housings 105.

Figure 3:
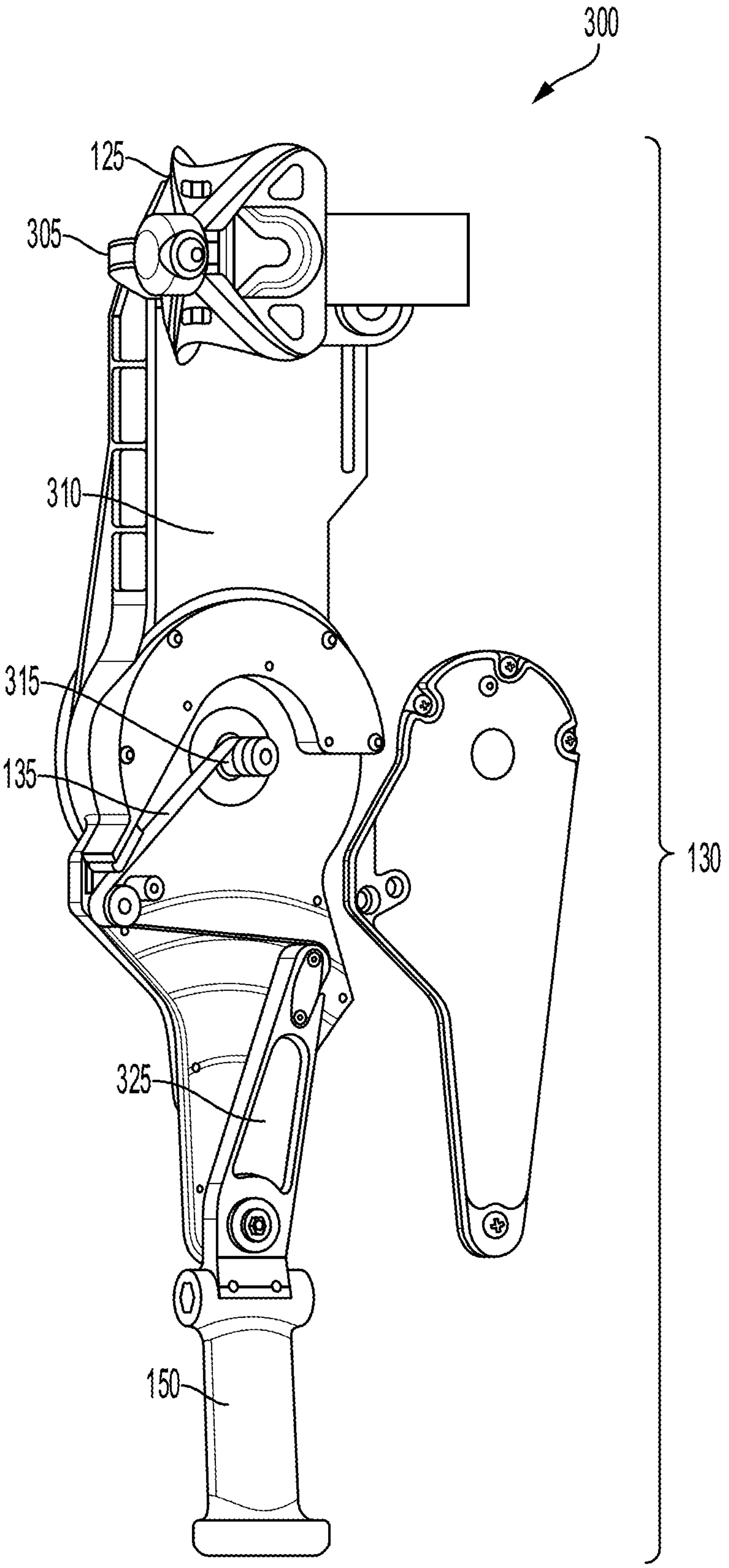
FIG. 3 illustrates a schematic diagram of an actuator module in accordance with an illustrative embodiment.

FIG. 3 illustrates a schematic diagram 300 of an actuator module 130 (e.g., actuator 130 of an exoskeleton 100. The actuator module 130 can include or correspond to a portion of the exoskeleton 100. In one embodiment, the actuator module 130 can include or correspond to a portion of the exoskeleton 100 except the boot 110. The actuator module 130 can be configured to connect or disconnect from the boot 110 portion of the exoskeleton 100 via a quick connect/disconnect mechanism described herein with respect to FIGS. 5, 7-11 and 13-17.

The actuator module 130 can include, but is not limited to the shin pad 125, a shin level 305, a chassis 310, a spool shaft 315, a belt 135, an ankle lever 325 and a post 150. The shin lever 305 can connect or couple the shin pad 125 to the actuator module 130 and/or the chassis 310 of the actuator module 130. In embodiments, the shin lever 305 can hold or align the shin pad 125 with a shin portion of the user or hold the shin pad 125 in place against or in contact with a shin or lower leg portion of the user when the user is wearing the exoskeleton 100. The chassis 310 can connect the shin lever 305 to the actuator module 130. The chassis 310 can connect the spool shaft 315, ankle lever 325 and/or post 150 to the actuator module 130. In embodiments, the chassis 310 can include a mechanical structure that connects or couples static components (e.g., shin lever, spool shaft) of the actuator module 130.

The spool shaft 315 can include or correspond to a shaft that is driven or controller by a motor to wind or release the belt 135. For example, the spool shaft 315 can wind or release the belt 135 in response to movement by the use while wearing the exoskeleton 100. The belt 135 can include a tensile member that is pulled by the spool shaft 315 and applies a force to the ankle lever 325. In embodiments, the exoskeleton 100 can include or use a mechanical transmission to move the axis of the spool shaft 315. The mechanical transmission can reduce a stack height of the system allowing the system to protrude less from the lateral side of the exoskeleton 100 and the user's leg. For example, the mechanical transmission of the spool shaft 315 can include, but is not limited to, a spur, helical, herring bone gears, and/or the belt 135. In embodiments, the size or properties of the stack dimensions can be adjusted based in part on the size of the spur, helical, herring bone gears, and/or the belt 135.

In embodiments, the belt 135 can be disposed around or wrap around the spool shaft 315. The belt 135 can connect the ankle lever 325 to the spool shaft 315. For example, the belt 135 can connect or wrap around a portion of the ankle lever 325 to apply torque to the ankle of the user. In other embodiments, a pulley system (e.g., idler pulley, block and tackle style) may be used such that the belt 135 wraps around the spool shaft 315 passes through the pulley system and connects to or wraps around a portion of the ankle lever 325. The belt 135 can run or wrap over the pulley that is mounted on an end portion of the ankle lever 325 and the end of the belt 135 can connect to or be fixed to the chassis 310. The ankle lever 325 can provide or transit torque or force to an ankle of the user during an activity or movement performed by the user wearing the exoskeleton 100. The post 150 can connect the actuator module 130 to the boot 110. The actuator module 130 can transmit or provide torque or force to the user, for example, via the boot 110 and/or shin pad 125. In some embodiments, the components of the actuator module 130 can generate the torque or power to provide the user for one or more movements.

Figure 4:
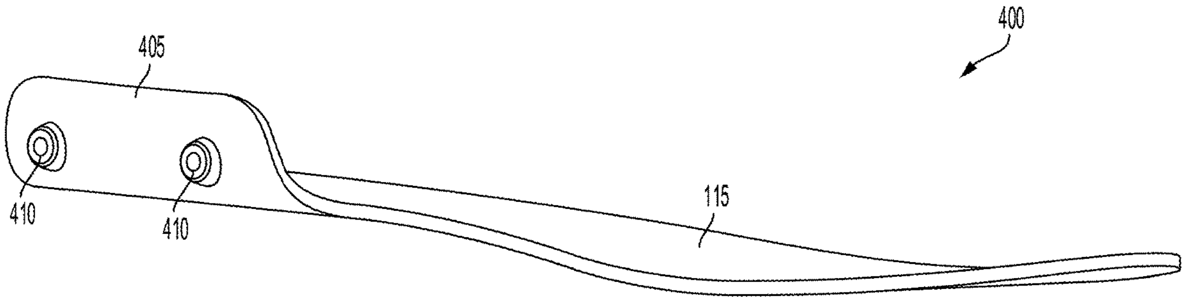
FIG. 4 illustrates a schematic diagram of a footplate in accordance with an illustrative embodiment.

FIG. 4 illustrates a schematic diagram 400 of a footplate 115 of an exoskeleton 100. The footplate 115 can include a side surface 405 and one or more orifices 410. The side surface 405 can include a surface of a side portion of the footplate 115 that is molded, bent upwards, curved upwards or shaped to receive a connection from the post 150 of the actuator module 130. The side surface 405 can extend upward such that it is parallel or aligned with a side surface of a boot 110 when the footplate 115 is inserted into a portion of the boot 110. In one embodiment, the side surface 405 includes a side or portion of the footplate that is positioned on or aligned with an outer edge of the boot 110. The side surface 405 can be positioned on an opposite side from the side of the leg facing the opposite leg of the user. The orifices 410 can include a hole, opening, slot or aperture formed through the side surface 405 of the footplate 115, for example, to receive or accept one or more fasteners (e.g., screws, bolts). The footplate 115 can include a carbon insert and can be configured to transmit torque from the actuator module 130 to the ground and to the user. The side surface 405 and orifices 410 can form attachment points designed into the footplate 115 to connect the footplate 115 to the actuator module 130. In embodiments, the footplate 115 can include an aluminum insert with tapped orifices 410 and cylindrical boss's is bonded into the footplate 115. In embodiments, the footplate 115 can provide a rigid mechanical connection to the boot structure 110. The bosses provide a structure that can be used for alignment and the footplate 115 can be sandwiched between two structures of the boot 110 reducing the stress concentration on the part. This design also allows the boot 110 to function as a normal boot 110 when there is no actuator module 130 attached.

Figure 5:
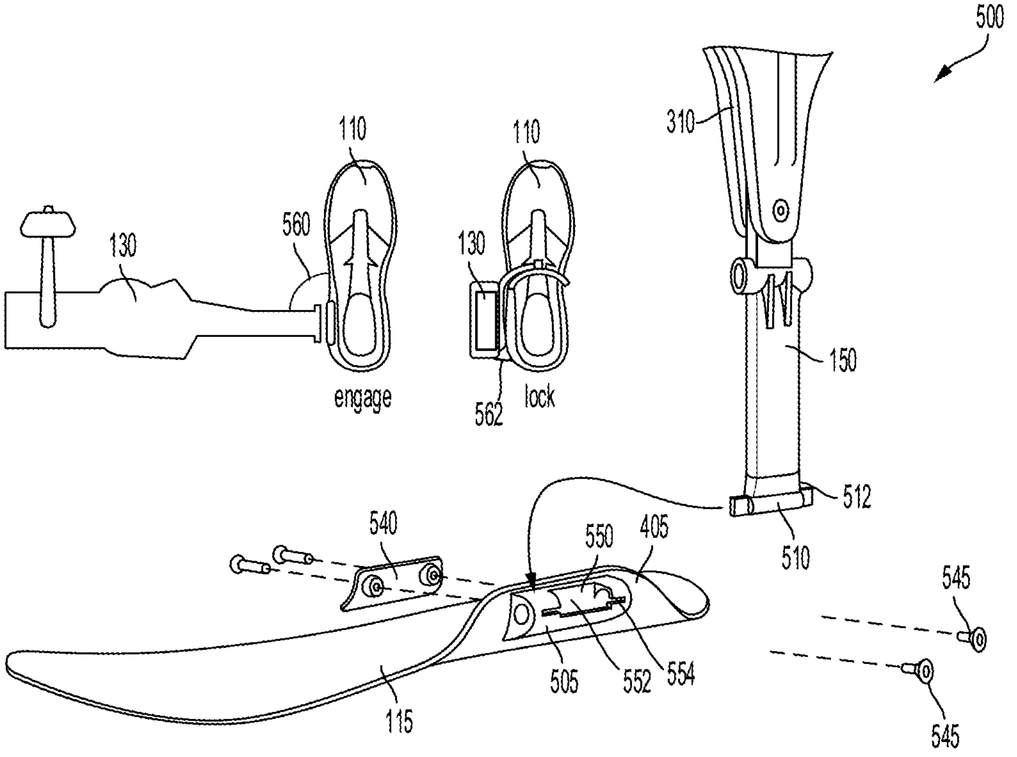
FIG. 5 illustrates a schematic diagram of an example of a quick disconnection mechanism in accordance with an illustrative embodiment.
Figure 6:
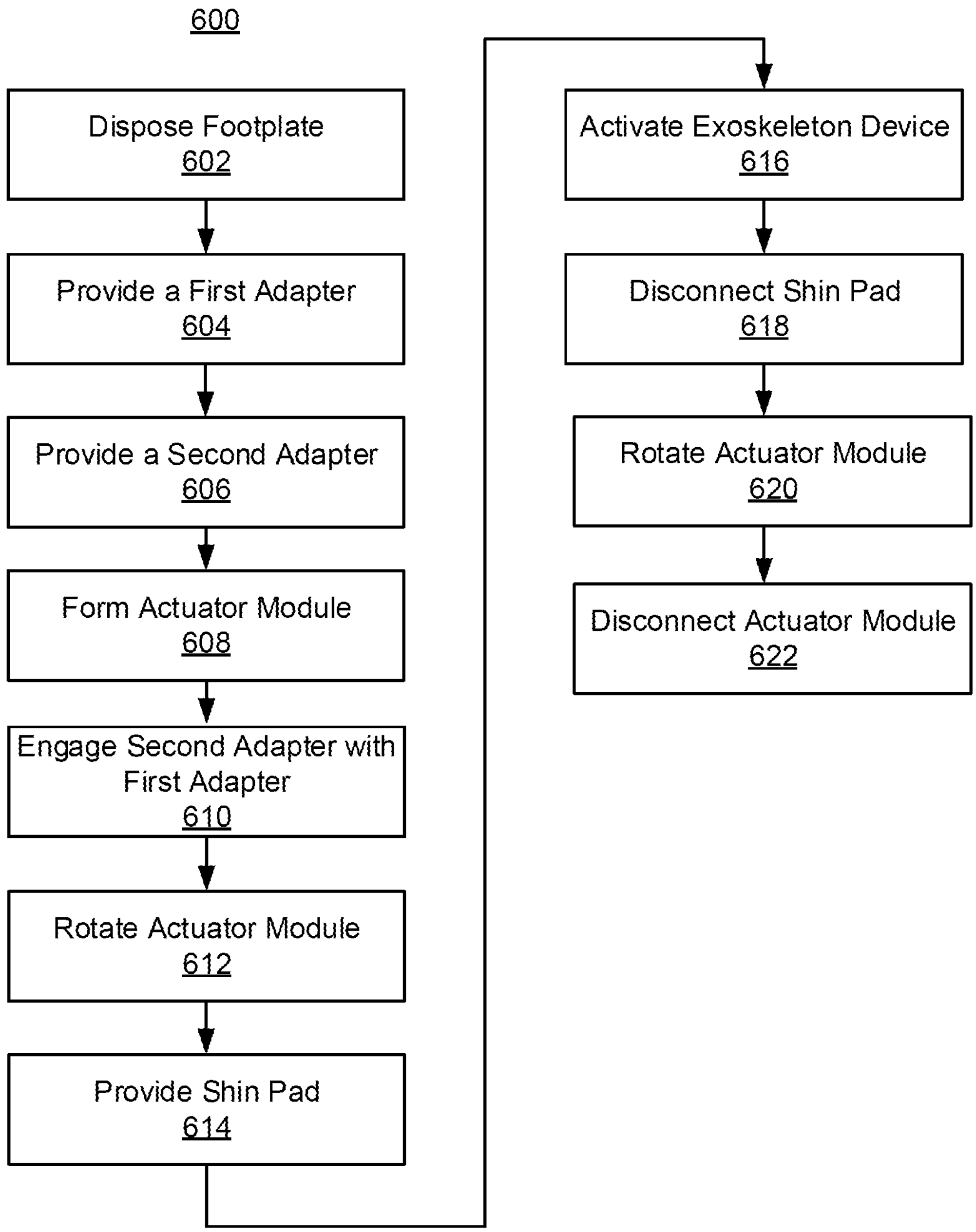
FIG. 6 is a flow diagram of a method of connecting and/or disconnecting an exoskeleton device from a boot in accordance with an illustrative embodiment.

Referring now to FIG. 5, depicted is a quick disconnection apparatus 500 that includes an actuator module 130 and a footplate 115. The quick disconnection apparatus 500 can enable quick and efficient connected and disconnecting an exoskeleton device 100 from a user and a boot 110 of a user. In embodiments, the quick disconnection apparatus or mechanism 500 can utilize a keyed shaft, for example, formed using a first adapter 505 of the footplate 115 and a second adapter 510 of the actuator module 130. The first adapter 505 can include a slot 550 (e.g., keyed slot, attachment point) configured to receive and engage an end portion (e.g., key, key portion) of the second adapter 510. The first adapter 505 can lock with the second adapter 510 when the second adapter 510 and the actuator module 130 are rotated, for example, about an axis of the first adapter 505. The locked position can be the same as or correspond to an operational position, for example, for a user of the exoskeleton device 100. In embodiments, the engagement position can include a connection or disconnection position that enables the exoskeleton device 100 to be connected to or disconnected from a boot 110 of a user. In some embodiments, the engagement position can be a position that cannot be accessed or reached when a shin strap and/or shin pad 125 is attached to the user. Additionally, a female adapter 505 (e.g., female keyed adapter), male adapter 510 (e.g., male keyed adapter), actuator module 130, and boot 110 are shown.

The footplate 115 (e.g., carbon insert) can include an adapter 505 (also referred to herein as first adapter). The first adapter 505 can be connected formed on a side surface 405 or outer edge surface 405 of the footplate 115 or formed (e.g., molded, bonded) on a side surface 405 or outer edge surface 405 of the footplate 115. The first adapter 505 can be connected to the side surface 405 of the footplate 115 using one or more fasteners 545 (e.g., screws, connectors, bolts, clamps). The footplate 115 and the first adapter 505 can include one or more holes or orifices 410 formed in or through the side surface 405 to receive fasteners 545 and connect the first adapter 505 to the side surface 405 of the footplate. In embodiments, a support plate 540 can be used to couple the first adapter 505 to the side surface 405 of the footplate 115. The support plate 540 (e.g., carbon insert backing) can be disposed or positioned on an inside surface of the side surface 405 and the first adapter 950 can be disposed or positioned on an outside surface of the side surface 405. The orifices 410 of the support plate 540, the footplate 115 and the first adapter 505 aligned such that one or more fasteners 545 can be disposed through the orifices 410 of the support plate 540, the footplate 115 and the first adapter 505 to couple or connect the first adapter 505 to the side surface 405 with the first adapter 505 positioned on the outer surface (e.g., exposed outside of the boot 110) of the side surface 405 of the footplate 115.

The first adapter 505 can include a slot 550 (e.g., keyed slot 550, attachment point) having a first portion 552 and a second portion 554. The slot 550 can include an opening, orifice, hole, indent, or groove formed through at least one surface of the first adapter 505. The slot 550 can include multiple portions, for example, to receive a device (e.g., end surface 512 of post 150) through a first portion 552 and lock with the device (e.g., post 150, actuator module 130) when the device is rotated within the slot 550 and about an axis of the slot 550. The first portion 552 and the second portion 554 can combine to form a keyed slot 550 or an attachment mechanism having portions with different dimensions. The first portion 552 and the second portions 554 can be formed having different shapes and/or dimensions to enable the actuator module 130 to engage with the first adapter 505 through the first portion 552 and lock with the first adapter 505 through the second portion 554. In embodiments, the first portion 552 can be formed having a first shape and the second portion 554 can be formed having a second shape, different from the first shape of the first portion 552. In embodiments, the first portion 552 can be formed having a first set of dimensions (e.g., length, width, depth, diameter) and the second portion 554 can be formed having a second set of dimensions (e.g., length, width, depth, diameter), different from the first set of dimensions. In one embodiments, the first portion 552 can have a rectangular shape and the second portion 554 can include a square shape and the first rectangular shaped portion 552 can include an opening have a larger width or longer width (e.g., measured along a central line across a center portion of the rectangular opening) than a width of an opening of the second square portion 554 (e.g., measure along a central line across a center portion of the square opening). The first portion 552 and the second portion 554 can be formed in a variety of different shapes, sizes and/or dimensions including, but not limited to, circular, spherical, tapered or other shapes configured to receive and engage at least a portion of a second adapter 510 of the post 150.

The actuator module 130 can include the chassis 310 and the post 150. In some embodiments, the actuator module 130 can include or correspond to the exoskeleton device 100 (e.g., include the components of the exoskeleton device 100) and/or a boot, for example, provided to a user to use or wear the exoskeleton device 100. The chassis 310 can include or correspond a mechanical structure that connects static components. For example, the chassis 310 can include a base, frame or structural framework configured to connect one or more components of the exoskeleton device 100 to the exoskeleton device 100 and/or to each other (e.g., shin pad 125, housing 105). The post 150 can include a mechanical structure configured to connect an exoskeleton device 100 to a boot 110 (or various other types of footwear) of a user. The post 150 can include a support device or support portion of the exoskeleton device 100. The chassis 310 and the post 150 can be connected or coupled together through one or more fasteners 545, connectors, clamps or other types of connection devices or mechanisms. In some embodiments, the chassis 310 and the post 150 can be formed together (e.g., molded together, welded) forming a single component.

The post 150 can include an adapter 510 (also referred to herein as second adapter 510) formed on at least one surface of the post 150. For example, in some embodiments, the second adapter 510 can be formed on or connected to an end surface 512 (e.g., opposite end of the surface of the post 150 that connects to the chassis 310) of the post 150. The second adapter 510 can be formed in a variety of different shapes, sizes and/or dimensions including, but not limited to, circular, spherical, tapered, patterned, grooved, ratcheted or other shapes or combinations of shapes configured to be inserted into the slot 550 and/or the first portion 552 of the slot 550. The second adapter 510 can include a molded or formed end surface 512 of the post 150 such that the second adapter 510 is a component of the post 150 and forms a single structure with the post 150. In embodiments, the second adapter 510 can be connected to the end surface 512 through one or more connectors or fasteners.

In some embodiments, the second adapter 510 can be formed having a set of dimensions (e.g., width, length, depth, diameter) that are less than the set of dimensions of the first portion 552 of the slot 550 and greater than the set of dimensions of the second portion 554 of the slot 550. The second adapter 510 can include a patterned shape, grooved shape or tapered shape having the same or similar dimensions (e.g., less than, smaller width) to the first portion 552 of the slot 550 such that the first adapter 510 can be inserted into the first portion 552 of the slot 550 and may not be removed from (e.g., larger width) the second portion 554 when the actuator module 130 is rotated to lock the first adapter 505 to the second adapter 510. In one embodiment, the second adapter 510 can be formed having a key shape or shaped to be received via the first portion 552 of slot 550 (e.g., keyed shaft) of the first adapter 505. The first adapter 505 and the second adapter 510 form a keyed joint when the actuator module 130 is rotated about an axis of the first adapter 505 and when the actuator module 130 is positioned at a second angle 562 relative to the first adapter 505.

The second adapter 510 can engage with the first portion 552 in a first position (e.g., connect, disconnect positon) and engage with the second portion 554 of the slot 550 at a second positon (e.g., lock positon). For example, the second adapter 510 can be inserted into the first portion 552 to engage the first adapter 510 through the first portion 552 when the second adapter 510 and actuator module 130 are at a first positon and first angle 560 relative to the first adapter 505. In embodiments, the second adapter 510 and the actuator module 130 can be rotated while the second adapter 510 is engaged with the first adapter 505 such that the second adapter 510 rotates from engaging with the first portion 552 to engaging with the second portion 554 of the slot 550 to lock the first adapter 902 to the second adapter 505 when the second adapter 510 and actuator module 130 are rotated to a second positon and second angle 562 relative to the first adapter 505. In embodiments, the first adapter 505 can form a keyed shaft with the second adapter 510 to enable the quick connect and/or disconnect mechanism of the exoskeleton device 100. In one embodiment, the first angle 960 can be 90 degrees, substantially 90 degrees or within a range from 45 degrees to 135 degrees and/or an angle such that the actuator module 130 is positioned perpendicular or substantially perpendicular to a lower limb of the user. In one embodiment, the second angle can be 0 degrees, no angle value, parallel to the first adapter 505, less than 45 degrees and/or an angle such that the actuator module 130 is positioned parallel to a lower limb of the user.

Referring now to FIG. 600, depicted is a flow diagram of one embodiment of a method 600 for method of connecting and/or disconnecting an exoskeleton device from a boot in accordance with an illustrative embodiment. In brief overview, the method 600 can include one or more of: disposing a footplate within a boot of a user (602), providing a first adapter (604), providing a second adapter (606), forming an actuator module (608), engaging the second adapter with the first adapter (610), rotating the actuator module (612), providing a shin pad of an exoskeleton device (614), activating the exoskeleton device (616), disconnect shin pad from user (618), rotate actuator module (620), and disconnect actuator module from boot (622). The functionalities of the method 600 may be implemented using, or performed by, the components detailed herein in connection with FIGS. 1-5 and 6-19. In some embodiments, the functionalities of the method 600 may be implemented using, executed by or performed by the exoskeleton 100 and computer system 1900.

Referring now to operation (602), and in some embodiments, a footplate 115 can be disposed within a boot 110 of a user. The footplate 115 can be disposed or inserted within a portion of the boot 110, including but not limited to, a sole of the boot 110. The footplate 115 can include a carbon-fiber structure, a carbon-fiber composite, a carbon insert, a carbon shank and/or other types of carbon material for forming a sole or bottom portion of footwear. The footplate 115 can be used to transmit force (e.g., torque, power) from exoskeleton device 100 to the ground (e.g., ground/surface user is on) and/or the user and/or receive/absorb force (e.g., torque, power) from the ground (e.g., ground/surface user is on) and/or the user. The footplate 115 can be inserted into the sole of the boot 110 to form the boot 110 such that the boot 110 and footplate 115 become a single structure. In some embodiments, the footplate 115 can be inserted between the sole or bottom portion of the boot 110 and an upper portion of the boot 110. For example, the footplate 115 can be sandwiched between two structures (e.g., base/soul/bottom portion and upper portion), thereby reducing the stress concentration between the two structures and a user wearing the respective boots 110.

Referring now to operation (604), and in some embodiments, a first adapter 505 can be provided. The first adapter 505 can be connected formed on a side surface 405 or outer edge surface 405 of the footplate 115 or formed on a side surface 405 or outer edge surface 405 of the footplate 115. For example, the first adapter 505 can be connected to the side surface 405 of the footplate 115 using one or more fasteners 545 (e.g., screws, connectors, bolts, clamps). The footplate 115 and the first adapter 505 can include one or more holes or orifices formed in or through the side surface 405 to receive fasteners 545 and connect the first adapter 505 to the side surface 405 of the footplate. In embodiments, a support plate 540 can be used to couple the first adapter 505 to the side surface 405 of the footplate 115. The support plate 540 (e.g., carbon insert backing) can be disposed or positioned on an inside surface of the side surface 405 and the first adapter 950 can be disposed or positioned on an outside surface of the side surface 405. The orifices of the support plate 540, the footplate 115 and the first adapter 505 aligned such that one or more fasteners 545 can be disposed through the orifices of the support plate 540, the footplate 115 and the first adapter 505 to couple or connect the first adapter 505 to the side surface 405 with the first adapter 505 positioned on the outer surface (e.g., exposed outside of the boot 110) of the side surface 405 of the footplate 115. In some embodiments, the first adapter 505 can be formed on the side surface 405 of the footplate 115. For example, the footplate 115 can be formed having the side surface 405 molded (e.g., fused, bonded) or configured to include the first adapter 505. In embodiments, the first adapter 505 can be formed on the side surface 405 of the footplate 115 such that the first adapter 505 and the footplate 115 form a single structure.

The first adapter 505 can include a slot 550 (e.g., keyed slot, attachment point) or a slot 550 can be formed into the first adapter 505. The slot 550 can include an opening, orifice, hole, indent, or groove formed into a surface (e.g., outer surface) of the first adapter 505. In some embodiments, one or more orifices can be formed within the slot 550, for example, to receive and connect to one or more fasteners 545. The slot 550 can be formed having one or more portions to form a keyed shaft. In embodiments, the slot 550 can include a first portion 552 and a second portion 554. The first portion 552 can be configured to receive a device (e.g., end surface 512 of post 150) and the second portion 554 can be configured to lock with the device (e.g., post 150, actuator module 130). The first portion 552 and the second portions 554 can be formed having different shapes and/or dimensions. In embodiments, the first portion 552 can be formed having a first shape and the second portion 554 can be formed having a second shape, different from the first shape of the first portion 552. In embodiments, the first portion 552 can be formed having a first set of dimensions (e.g., length, width, depth, diameter) and the second portion 554 can be formed having a second set of dimensions (e.g., length, width, depth, diameter), different from the first set of dimensions. In one embodiments, the first portion 552 can have a rectangular shape and the second portion 554 can include a square shape and the first rectangular shaped portion 552 can include an opening have a larger width or longer width (e.g., measured along a central line across a center portion of the rectangular opening) than a width of an opening of the second square portion 554 (e.g., measure along a central line across a center portion of the square opening).

Referring now to operation (606), and in some embodiments, a second adapter 510 is provided. The second adapter 510 can be formed on at least one surface (e.g., end surface 512) of a post 150 or connected to at least one surface of the post 150. In embodiments, an end surface 512 of the post 150 can be molded to form the second adapter 510 including one or more grooved edges, keyed surface, patterned surface or tapered surface, for example, to enable locking with a second portion 554 of the slot 550 of the first adapter 505. In some embodiments, the second adapter 510 can be bonded or fused onto the end surface 512 of the post 150, for example, such that the second adapter 510 and the post 150 form a single structure. In embodiments, the second adapter 510 can be connected to the end surface 512 of the post 150 through one or more fasteners 545 (e.g., connectors, clamps).

Referring now to operation (608), and in some embodiments, an actuator module 130 can be formed. In embodiments, the actuator module 130 can be formed by connecting a chassis 310 to a post 150. The chassis 310 can be connected to the post 150 through a variety of different techniques. In some embodiments, an end surface of the chassis 310 can include a more groove or slot having one or more wall surfaces to receive an end surface of the post 150 and the wall surfaces can include one or more orifices to receive one or more fasteners. The end surface of the post 150 can be inserted into or disposed within the groove and between the wall surfaces and the one or more fasteners 545 can be inserted through the orifices wall surfaces and of the end surface of the post 150 to connect the post 150 to the chassis 310. In some embodiments, an end surface of the chassis 310 can be fused, bonded or joined to end surface of the post 150. In embodiments, the chassis 310 can be connected or coupled to the post 150 through one or more fasteners 545 (e.g., connectors, bolts, support plates, clamps). The chassis 310 can be connected to the post 150 to form the actuator module 130 or form a part or portion of the actuator module 130. In embodiments, the actuator module 130 can include the chassis 310 and post 150 and/one or more other components (e.g., housing 105, shin pad 125, shin lever) of the exoskeleton device 100.

Referring now to operation (610), and in some embodiments, the second adapter 510 can be engaged with the first adapter 505. The actuator module 130, including the post 150 and second adapter 510 can be positioned at a first positon and a first angle 560 (e.g., perpendicular) with respect to the first adapter 505. The second adapter 510 at the first angle 560 with respect to the first adapter 505 such that the second adapter 510 can be inserted into or disposed through the first portion 552 of the slot 550 of the first adapter 505. In embodiments, the slot 550 (e.g., first portion 552) can be designed such that the first adapter 505 can be engaged from a side position (e.g., first angle 560) and receive an end (e.g., keyed end) of the second adapter 510. The second adapter 510 can be inserted into the first portion 552 of the slot 550 to engage the actuator module 130 with the first adapter 505.

Referring now to operation (612), and in some embodiments, the actuator module 130 can be rotated. The actuator module 130 can be rotated from the first position and the first angle 906 to a second position and a second angle 562 relative to the first adapter 505 to lock the actuator module 130 and second adapter 510 with the first adapter 505. The actuator module 130 can be rotated about an axis of the first adapter 505 or rotated with the second adapter 510 is disposed within the slot 550 such that the first adapter 505 forms a pivot point for the actuator module 130 to rotate form the from the first position and the first angle 560 to a second position and a second angle 562. In some embodiments, the actuator module 130 can be parallel or aligned with the side surface 405 of the footplate 115 and a leg of a user when the actuator module 130 is at the second angle 562 relative to the first adapter 505. The actuator module 130 can be rotated from a side positon to an upright with respect to the first adapter 505 and the boot 110. When the actuator module 130 is moved or rotates from the first angle 560 to the second angle 562, the second adapter 510 can transition, rotate or move from being positioned within (e.g., disposed, inserted) the first portion 552 of the slot 550 to the second portion 554 of the slot 550. In some embodiments, the second portion 554 can include smaller dimensions (e.g., smaller width of opening) and/or a different shape such that the second adapter 510 is locked within (e.g., not removable) the second portion 554 of the slot 550. The second adapter 510 can be disposed within the second portion 554 of the slot 550 when the actuator module 130 is at the second angle 562 relative to the first adapter 505 such that a neck portion (e.g., connected to the second adapter 510) or surface of the post 150 that has a smaller width than the second adapter is in contact with the edges of the opening of second portion 554 and the second adapter 914 cannot be removed from the slot 550. In embodiments, the first adapter 505 and the second adapter 510 can form a keyed joint when the actuator module 130 is positioned at the second angle relative to the first adapter. The first adapter 505 and the second adapter 510 can lock with the first adapter 505 to hold or maintain the actuator module 130 at the second positon and the second angle 962 relative to the first adapter 505.

In embodiments, the actuator module 130 and exoskeleton device 100 can provide force or torque to the user (e.g., lower limb of the user) when the actuator module 130 and exoskeleton device 100 are rotated to the second positon and at the second angle 562 relative to the first adapter 505. For example, in some embodiments, the first adapter 505 and the second adapter 510 can lock (e.g., form a keyed lock) to enable the actuator module 130 and exoskeleton device 100 to provide force or torque to the user (e.g., lower limb of the user) when the actuator module 130 and exoskeleton device 100 are rotated to the second positon and at the second angle 962 relative to the first adapter 505. In other embodiments, when the actuator module 130 and exoskeleton device 100 are positioned at the first positon and at the first angle 560 relative to the first adapter 505, the actuator module 130 and exoskeleton device 110 may provide little force, no force and/or be disengaged from the boot 110. In embodiments, the actuator module 130 can provide a force at a first level (e.g., zero force, minimal force) to the first adapter 505 and the second adapter 510 when the actuator module 130 is positioned at the first angle 560 relative to the first adapter 505 and the actuator module 130 can provide a force at a second level (e.g., generated force or torque to augment user movement during an activity, requested force or torque by user) to the first adapter 505 and the second adapter 510 when the actuator module 130 is positioned at the second angle 562 relative to the first adapter 505.

Referring now to operation (614), and in some embodiments, a shin pad 125 can be provided. A shin pad 125 can be provided, for example, of an exoskeleton boot 100 for coupling to a shin of a user. In embodiments, when the exoskeleton device 100 is connected to a leg of a user, the shin pad 125 can positioned such that shin pad 125 connects to or contacts a shin of the user and/or an area below a knee of the user. The shin pad 125 can be a component or portion of the exoskeleton boot 100. The shin pad 125 can be coupled to (e.g., connected to, attached to, directly connected to) to the exoskeleton boot 100. In embodiments, the shin pad 125 can be coupled to at least one housing 105 of one or more housings 105 of the exoskeleton device 100. The shin pad 125 can couple with or contact the shin of the user, for example, to aid in connecting or securing the exoskeleton boot 100 to a lower limb of the user. The shin pad 125 can be positioned, when the user is wearing the exoskeleton boot 100, to provide support and/or comfort to the respective lower limb that the exoskeleton boot 100 is coupled. The shin pad 125 can include a strap, belt, connector, fastener or other type of mechanism for securing the shin pad 125 in contact with a portion of the leg of the user. In embodiments, the strap can wrap around the leg of the user to secure the shin pad 125 and exoskeleton device to the leg of the user. The shin pad 125 can connect to the leg of the user to maintain the exoskeleton device 100 and the actuator module 130 in an upright position such that the second adapter 510 remains locked with the first adapter 505 when the shin pad 125 can connect to the leg of the user.

In embodiments, the exoskeleton device 100 can include one or more housings 105 to hold, enclose or contain, but not limited to, electronic circuitry, sensors and/or motors of the exoskeleton boot 100. For example, the housings 105 can enclose or include a controller having a memory and one or more processors, for example, coupled to the memory (e.g., computer system 1900, processor 1902, memory 1904 of FIG. 19). The housings 105 can enclose or include, but not limited to, an electric motor that generates to torque about an axis of rotation of an ankle joint of the user. The housings 105 can provide protection for the controller and electronic motor from various environmental elements or conditions (e.g., water, rain, snow, mud, dirt) of an environment the exoskeleton device 100 is being used or worn. The housing 105 can be formed to cover or encapsulate the electronic circuitry, sensors and/or motors, including the controller and electronic motor. The positioning of the housings 105 on the exoskeleton device 100 can vary, based at least in part on a type of exoskeleton 100 and one or more other components (e.g., shin pad 125, encoders 155, 160) of the exoskeleton 100.

In some embodiments, a battery holder 170 can be provided, for example, coupled to the shin pad 125. The battery holder 170 can be configured to receive, connect to or hold a battery module 145. The battery holder 170 can include or correspond to a cavity, compartment, chamber or structure shaped and designed to hold the battery module 145, for example, in place during operation or use of the exoskeleton device 100. In embodiments, the battery holder 170 can secure or hold the battery module 145 motionless (or limit movement of battery module 145) during operation or use of the exoskeleton device 100. In some embodiments, the battery holder 170 can enclose the battery module 145 and include material to provide protection for the battery module 145 from various environmental elements or conditions of an environment the exoskeleton device 100 is being used or worn. The positioning of the battery holder 170 on the exoskeleton device 100 can vary, based at least in part on a type of exoskeleton device 100 and one or more other components (e.g., shin pad 125, encoders 155, 160) of the exoskeleton 100. In embodiments, the battery holder 170 can couple with or connect to the shin pad 125 of the exoskeleton boot 100 and below the knee of the user. In embodiments, an output shaft can be provided, for example, coupled to the electric motor and extending through a bore in a housing 105 of the one or more housings 105 enclosing the electric motor. The output shaft can connect to (e.g., directly connect to) the electric motor. In embodiments, the output shaft can extend through a bore in a housing 105 of the one or more housings 105 enclosing the electric motor to couple with the electric motor.

Referring now to operation (616), and in some embodiments, an exoskeleton device 100 can be activated. The exoskeleton device 100 can activated or powered on through a controller 1410 and battery module 145 of the exoskeleton device 100. The exoskeleton device 100 can augment or aid the user in performing one or more activities. In embodiments, the exoskeleton device 100 can provide force, torque and/or power to the lower limb of the user the exoskeleton boot 100 is coupled to with to augment the movement of the user during the activity. The activity can include steady state activities or transient activities. The activity can vary and can include any type of movement or motion performed or executed by the user and/or any type of use of one or more muscles of the user, for example, that may not involve motion (e.g., holding a position, standing). For example, the activity (e.g., physical activity) can include, but is not limited to, walking, running, standing, standing up, ascend or descend a surface (e.g., stairs), jogging, springing, jumping (e.g., single leg or both legs) squat, crouch, kneel or kick. In embodiments, the exoskeleton device 100 can transfer energy to the lower limb of the user through the footplate 115 and/or shin pad 125 to augment the movement of the user during the activity. The exoskeleton boot 100 can reduce a difficulty of performing the respective activity by reducing the energy or effort the user exerts to perform the respective activity.

Referring now to operation (618), and in some embodiments, the shin pad 125 can be disconnected from the user. The shin pad 125 can be disconnected from the user. For example, a strap (e.g., connector, belt, fastener) can be undone, loosened or opened to disconnect the shin pad 125 from the leg of the user or such that the shin pad 125 is no longer in contact with the leg of the user.

Referring now to operation (620), and in some embodiments, the actuator module 130 can be rotated. The actuator module 130 can be rotated from the second position and second first angle 9562 to the first position and the first angle 560 relative to the first adapter 505 to unlock the actuator module 130 and second adapter 510 from the first adapter 505. The actuator module 130 can be rotated about an axis of the first adapter 505 or rotated with the second adapter 510 disposed within the slot 550 such that the first adapter 505 forms a pivot point for the actuator module 130 to rotate form the from the second position (e.g., upright) and the second angle 562 to the first position and the first angle 560. In embodiments, the actuator module 130 can be rotated from an upright position relative to the boot 110 and the first adapter 505 to a side positon with respect to the first adapter 505 and the boot 110. When the actuator module 130 is moved or rotates from the second angle 562 to the first angle 560, the second adapter 510 can transition, rotate or move from being positioned within (e.g., disposed, inserted) the second portion 554 of the slot 550 to the first portion 552 of the slot 550. In some embodiments, the first portion 552 can include greater or larger dimensions (e.g., larger width of opening) and/or a different shape such that the second adapter 510 can be removed (or inserted) from the slot 550 through the first portion 552 of the slot 550. The actuator module 130 can be rotated until the second adapter 510 is aligned with the first portion 552 of the slot 550 and the actuator module 130 can be unlocked from the first adapter 505 and still engaged with the first adapter 505 with the second adapter 510 disposed within the first portion 552 of the slot 550.

Referring now to operation (622), and in some embodiments, the actuator module 130 can be disconnected from the boot 110. The actuator module 130, including the post 150 and second adapter 510 can be positioned at the first positon and the first angle 560 (e.g., perpendicular) with respect to the first adapter 505 and the second adapter 510 can be removed from the slot 550 of the first adapter 505 to disconnect or disengage the actuator module 130 and the second adapter 510 from the first adapter 510. In some embodiments, the actuator module 130 can be moved in a sideways motion or perpendicular direction from the first adapter 505 and the boot 110 to disconnect the actuator module 130 from the boot 110. In embodiments, the slot 550 (e.g., first portion 552) can be designed such that the first adapter 505 can be disengaged from the side position (e.g., first angle 560) and enable an end (e.g., keyed end) of the second adapter 510 to be removed from the first portion 552 of the slot 550.

Figure 7:
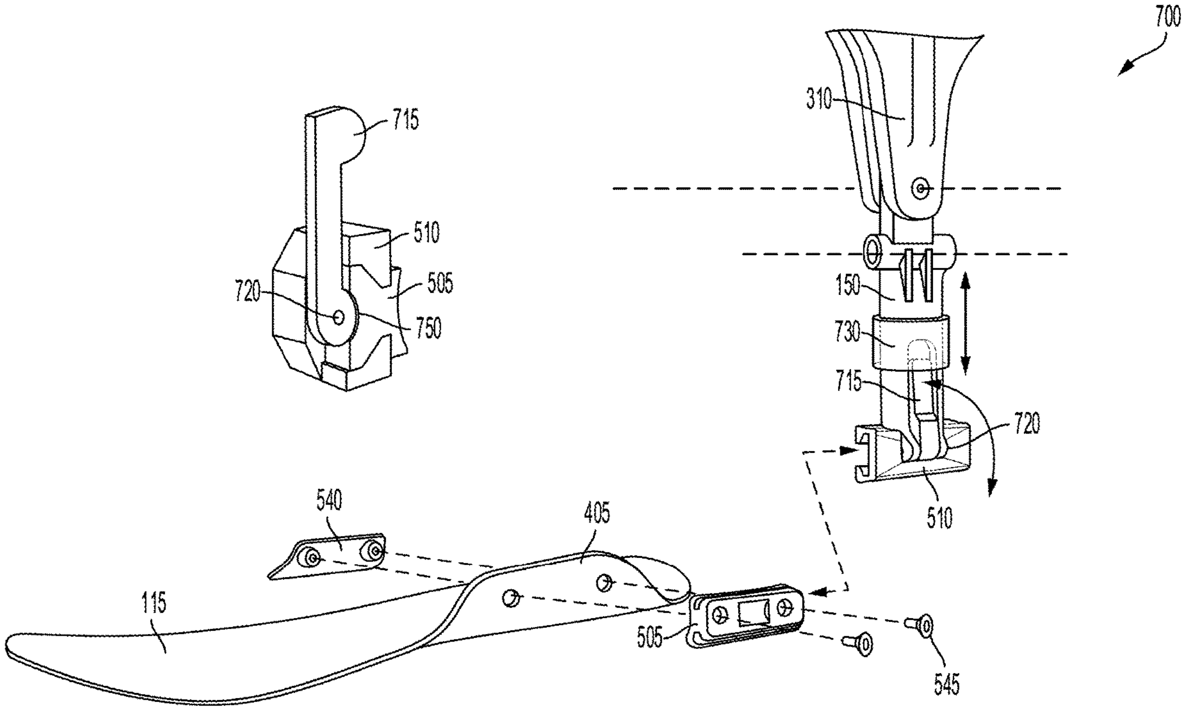
FIG. 7 illustrates a schematic diagram of an example of a quick disconnection mechanism in accordance with an illustrative embodiment.

FIG. 7 illustrates an example of a quick disconnection mechanism 700. The quick disconnection mechanism 700 (or connection mechanism 700) can include a first adapter 505 that is shaped or configured as a male T-slot connector (e.g., male part 505, receive female T-slot). The male T-slot adapter 505 can be connected to the side surface 405 of the footplate 115. In embodiments, the male T-slot adapter 505 can connect to the side surface 405 through one or more fasteners 545 and a support plate 540 disposed on an opposite side or opposite surface from the side surface 405 the male T-slot adapter 505 contacts. In embodiments, the male T-slot adapter 505 can include a grooved surface, patterned surface or channel that is configured to receive and connect to (e.g., slide on, clamp on) a second adapter 510 shaped as a female T-slot. An end portion 512 of the post 150 can include the female T-slot adapter 510. The female T-slot adapter 510 can be connected to the end portion 512 of the post 150 through one or more fasteners 545. In some embodiments, the female T-slot adapter 510 can be bonded, molded or otherwise formed on the end portion 512 of the post 150 through one or more fasteners 545. The female T-slot adapter 510 can include a crimped edge, grooved edge or clamp shaped edge that is configured to connect to the male T-slot adapter 505. In embodiments, the female T-slot adapter 510 can slide onto, clamp onto or connect with the male T-slot adapter 505 to connect the actuator module 130 to the boot 110.

In some embodiments, the actuator module 130 can include a lever actuated cam 715 (e.g., cam axle 720) that is configured to engage a slot (e.g., first adapter 505) and provides an outward force. The level actuated cam 715 and cam axle 720 can connect the female T-slot adapter 510 to the male T-slot adapter 505 and/or provide a force to connect the female T-slot adapter 510 to the male T-slot adapter 505. In embodiments, the level actuated cam 715 and cam axle 720 can be rotated about a cam interface and slot 750 to provide a force to connect the female T-slot adapter 510 to the male T-slot adapter 505. In some embodiments, the male T-slot adapter 505 and the female T-slot adapter 510 include a taper which creates a wedging action when the cam lever 715 is engaged. A safety collar 730 can be slid over the cam lever 715 to further secure the female T-slot adapter 510 to the male T-slot adapter 505 and ensure that the cam lever 715 does not open during operation (e.g., movements performed by the user wearing the exoskeleton 100).

Figure 8:
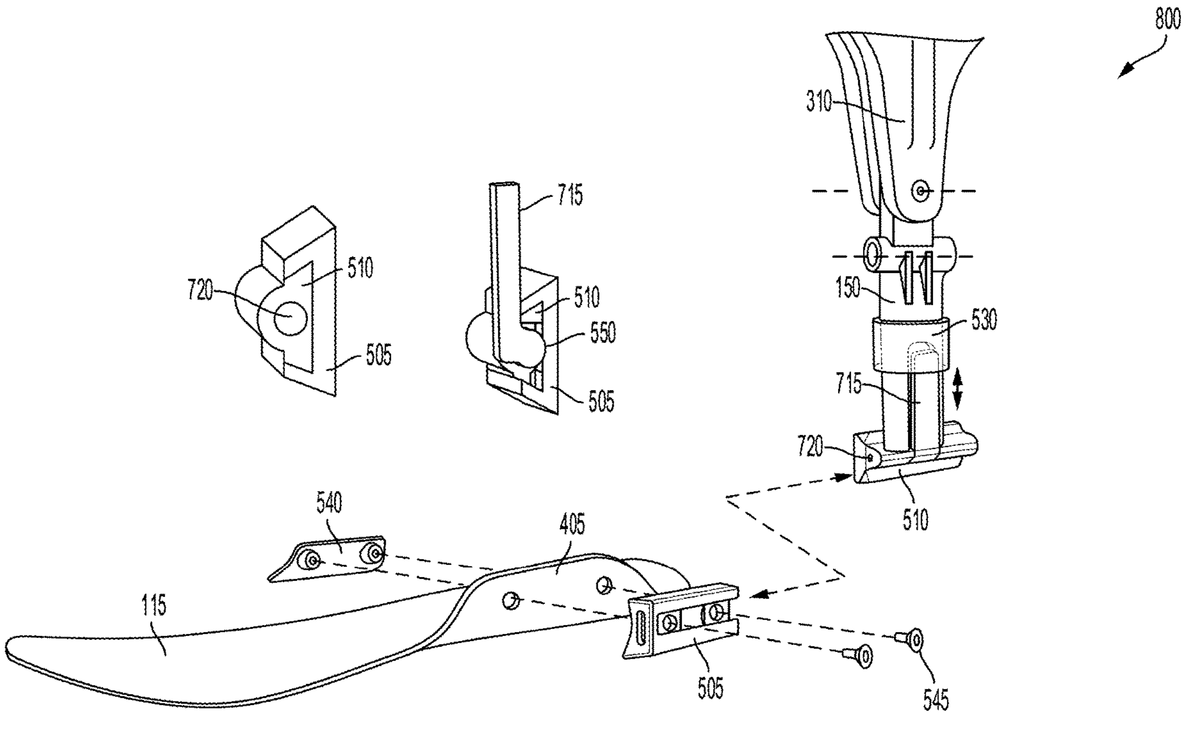
FIG. 8 illustrates a schematic diagram of an example of a quick disconnection mechanism in accordance with an illustrative embodiment.

FIG. 8 illustrates an example of a quick disconnection mechanism 800 (or quick connection mechanism). In embodiments, the quick disconnection mechanism 800 of FIG. 8 can be opposite of the quick disconnection mechanism 700 of FIG. 7 in that the first adapter 505 connected to the footplate 115 can include or correspond to a female T-slot adapter and the second adapter 510 connected to the post 150 can include or correspond to a male T-slot adapter. In embodiments, the female T-slot adapter 505 can be connected to the side surface 405 of the footplate 115. The female T-slot adapter 505 can connect to the side surface 405 through one or more fasteners 545 and a support plate 540 disposed on an opposite side or opposite surface from the side surface 405 the female T-slot adapter 505 contacts. The female T-slot adapter 505 can include a crimped edge, grooved edge or clamp shaped edge that is configured to connect to the male T-slot adapter 510. An end portion 512 of the post 150 can include the male T-slot adapter 510. The male T-slot adapter 510 can be connected to the end portion 512 of the post 150 through one or more fasteners 545. In some embodiments, the male T-slot adapter 510 can be bonded, molded or otherwise formed on the end portion 512 of the post 150 through one or more fasteners 545. The male T-slot adapter 510 can include a crimped edge, grooved edge or clamp shaped edge that is configured to connect to the female T-slot adapter 505. In embodiments, the male T-slot adapter 510 can slide onto, slide into, clamp onto or connect with the female T-slot adapter 505 to connect the actuator module 130 to the boot 110.

In some embodiments, the actuator module 130 can include a lever actuated cam 715 configured to engage a slot of the female T-slot adapter 505. In embodiments, when closed, the level actuated cam 715 can create an there can be an interference between the cam 715 and the slot if the female T-slot adapter 505 the cam 715 fits into. The interference can cause or create a force wedging the tapered parts of male T-slot adapter 510 and the female T-slot adapter 505 together. In some embodiments, the cam 715 can reduce or eliminate the backlash in the mechanism or connection between the male T-slot adapter 510 and the female T-slot adapter 505. In embodiments, a safety collar 530 can be slid over the cam lever 715 to lock it in the closed position and further secure the female T-slot adapter 510 to the male T-slot adapter 505 and ensure that the cam lever 715 does not open during operation (e.g., movements performed by the user wearing the exoskeleton 100).

Figure 9:
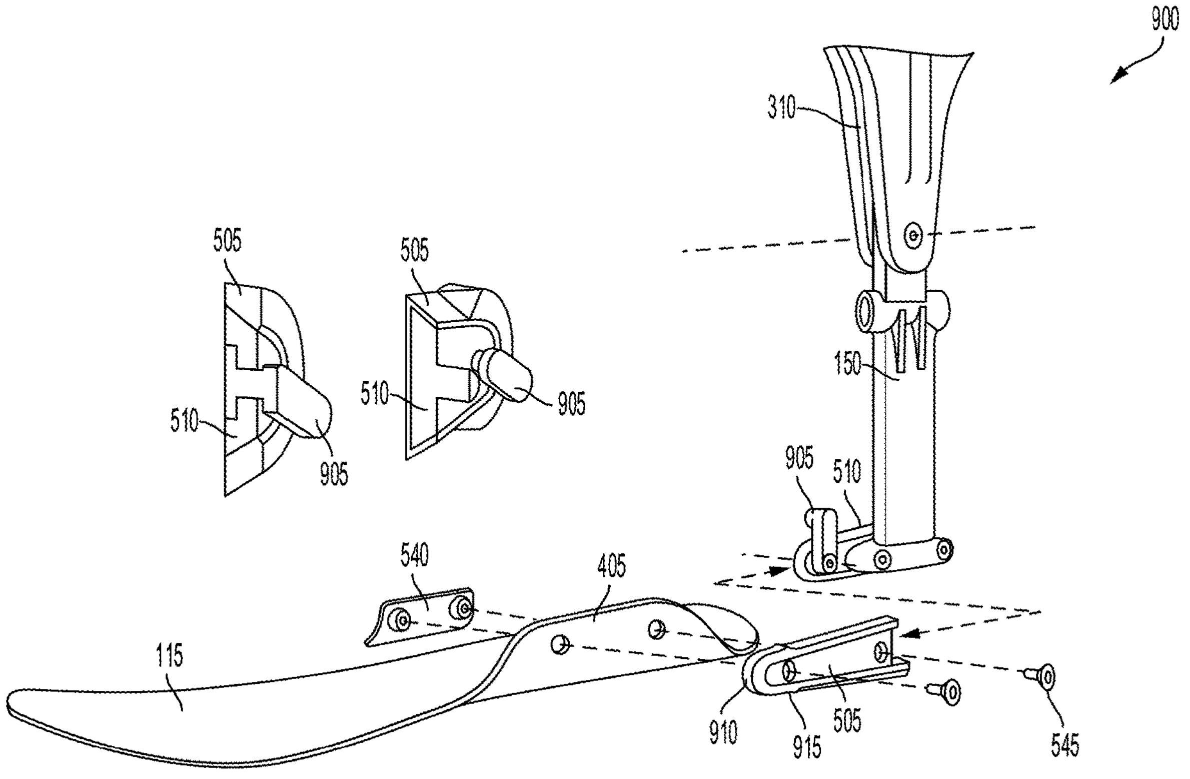
FIG. 9 illustrates a schematic diagram of an example of a quick disconnection mechanism in accordance with an illustrative embodiment.

FIG. 9 illustrates an example of a quick disconnection mechanism 900. The quick disconnection mechanism 900 (or quick connection mechanism) can include adapters having tapered slots and ends to connect the actuator module 130 to the boot 110. The quick disconnection mechanism 900 can include a first adapter 505 configured as a tapered female slot and a second adapter 510 configured as a tapered male slot. In embodiments, the tapered female slot adapter 505 can be connected to the side surface 405 of the footplate 115. The tapered female slot adapter 505 can connect to the side surface 405 through one or more fasteners 545 and a support plate 540 disposed on an opposite side or opposite surface from the side surface 405 the tapered female slot adapter 505 contacts. The tapered female slot adapter 505 can include a tapered grooved slot configured to receive and connect to the tapered male adapter 510. An end portion 512 of the post 150 can include the tapered male adapter 510. The tapered male adapter 510 can be connected to the end portion 512 of the post 150 through one or more fasteners 545. In some embodiments, the tapered male adapter 510 can be bonded, molded or otherwise formed on the end portion 512 of the post 150 through one or more fasteners 545. The tapered male adapter 510 can include a tapered shape or tapered edge that is configured to connect to the tapered female slot adapter 505. In embodiments, the tapered male adapter 510 can slide onto, slide into, or connect with the tapered female slot adapter 505 to connect the actuator module 130 to the boot 110. The tapered male adapter 510 can be tapered in an opposite direction from the taper of the tapered female slot 505. In embodiments, the tapered male adapter 510 and the tapered female slot 505 can be tapered in opposite directions and having dimensions such that the tapered male adapter 510 can connect with the tapered female slot adapter 505. In some embodiments, the actuator module 130 can include a lever with a cam follower 905 position on a front portion of the tapered male adapter 510. The cam follower 905 can engage with the tapered female slot 505 to connect or tighten a connection between the tapered male adapter 510 and the tapered female slot 505. The cam follower 905, when actuated, can pull the tapered male adapter 510 and the tapered female slot 505 together creating an interference or wedging fit between the tapered male adapter 510 and the tapered female slot 505. In some embodiments, the tapered female slot adapter 505 can include a cam stop 915, for example, at an end of a cam profile 910 of the tapered female slot adapter 505 to prevent the cam follower 905 from leaving the cam surface and maintaining a connection between the tapered male adapter 510 and the tapered female slot 505.

Figure 10:
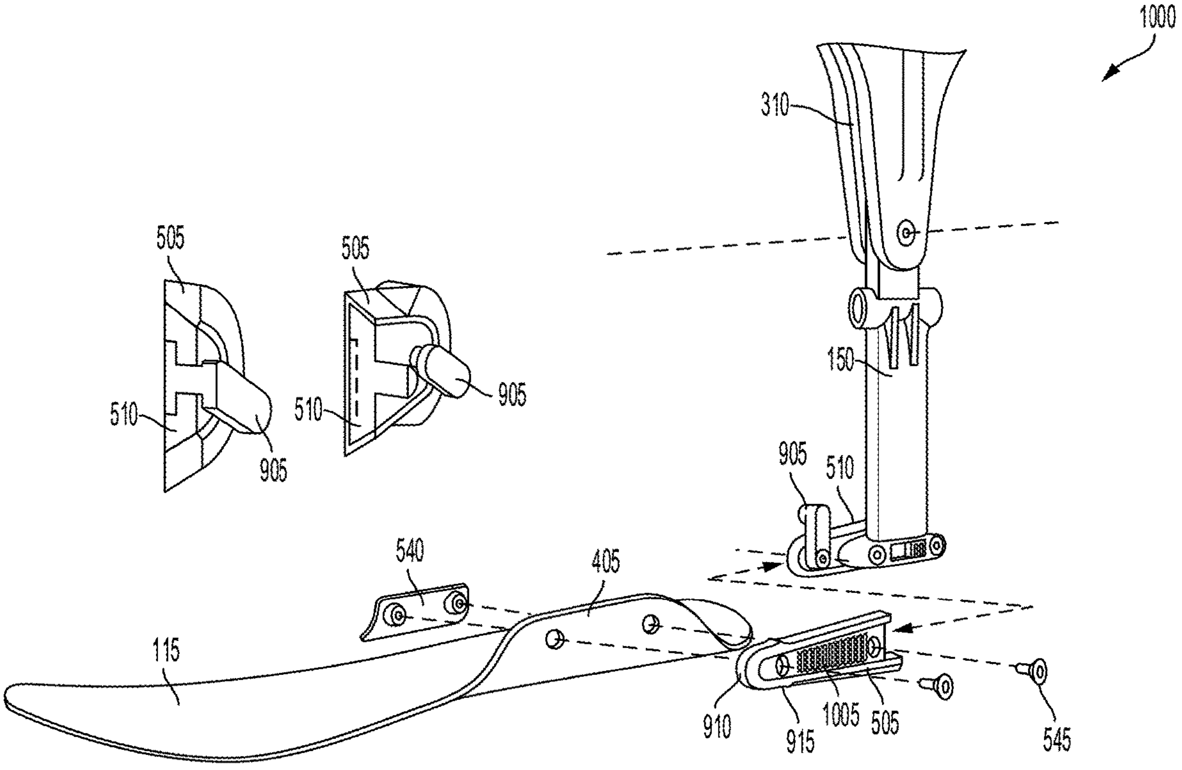
FIG. 10 illustrates a schematic diagram of an example of a quick disconnection mechanism in accordance with an illustrative embodiment.

FIG. 10 illustrates an example of a quick disconnection mechanism 1000. The quick disconnection mechanism 1000 (or quick connection mechanism 1000) can be similar to the quick disconnection mechanism 900 of FIG. 9 having tapered slots, however the quick disconnection mechanism 1000 can include a ratchet portion to secure or lock the tapered male adapter 510 and the tapered female slot adapter 505 together. In embodiments, the tapered female slot adapter 505 can include a ratchet 1005 (e.g., ratchet teeth, ratchet portion, slots). The ratchet 1005 can include a plurality of slots formed into the inner area or inner surface of the tapered female slot adapter 505. In some embodiments, the ratchet 1005 can connect with or engage with one or more grooves or a ratchet portion formed on an outer surface of the tapered male adapter 510 such that as the tapered male adapter 510 is slid into the tapered female slot adapter 505, the ratchet 1005 prevents the tapered male adapter 510 and the tapered female slot adapter 505 from coming apart or disconnecting. In some embodiments, the cam follower 905 can engage with or connect to the ratchet 1005 of the tapered female slot adapter 505 when the tapered male adapter 510 and the tapered female slot adapter 505 are engaged. The cam follower 905 can engage with the ratchet 1005 to connect or tighten a connection between the tapered male adapter 510 and the tapered female slot 505. The cam follower 905, when actuated, can pull the tapered male adapter 510 and the tapered female slot 505 together creating an interference or wedging fit between the tapered male adapter 510 and the tapered female slot 505. In embodiments, lifting the cam follower 905 can disengage the cam follower 905 and the tapered male adapter 510 from the ratchet 1005 and the tapered male adapter 510 can be removed (e.g., slid out) from the tapered female slot adapter 505.

Figure 11:
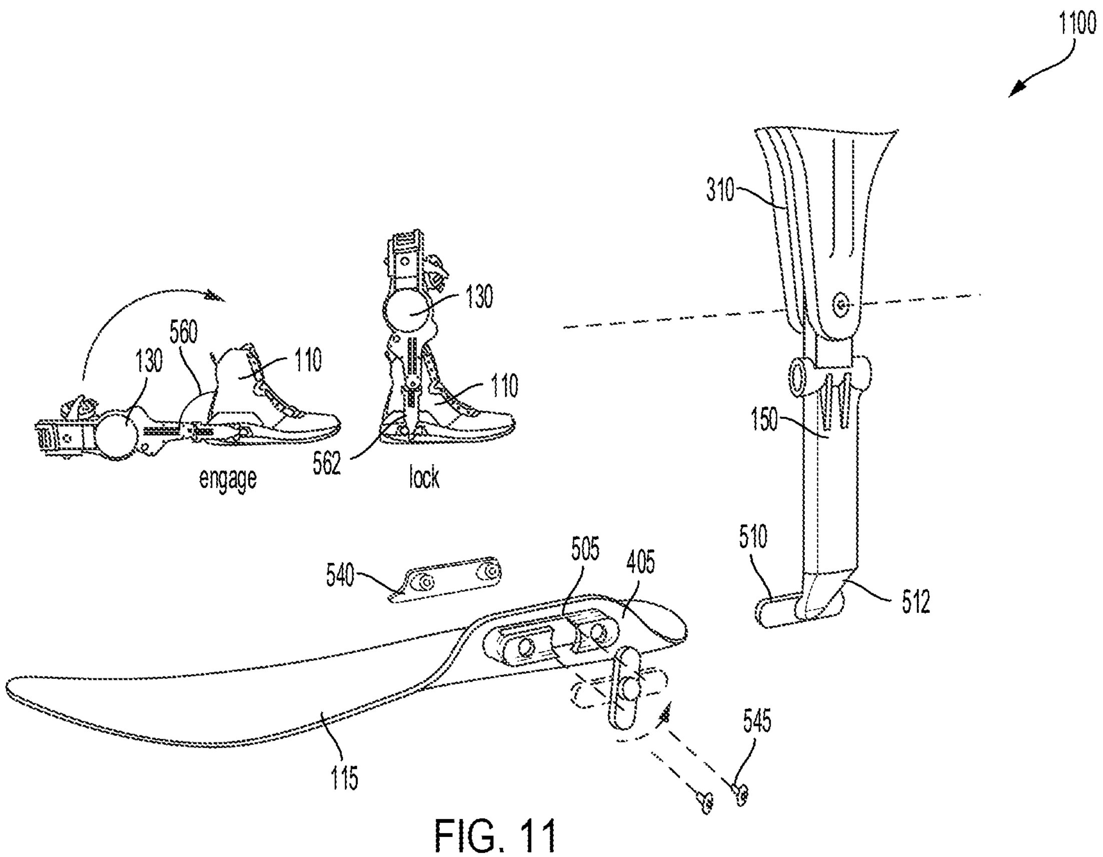
FIG. 11 illustrates a schematic diagram of an example of a quick disconnection mechanism in accordance with an illustrative embodiment.

FIG. 11 illustrates an example of a quick disconnection mechanism 1100 (or quick connection mechanism 1100). The quick disconnection mechanism 1100 can include or utilize a keyed mechanism to connect the first adapter 505 to the second adapter 510. In embodiments, the first adapter 505 can be connected to the side surface 405 of the footplate 115. The first adapter 505 can connect to the side surface 405 through one or more fasteners 545 and a support plate 540 disposed on an opposite side or opposite surface from the side surface 405 the first adapter 505 contacts. The first adapter 505 can include a slot or orifice configured to receive the second adapter 510. The second adapter 510 can be rotated or turned while engaged with the slot of the first adapter 505 to lock the actuator module 130 to the boot 110. In embodiments, the slot of the first adapter 505 can include a first portion to receive the second adapter 510 can a second portion to enable the second adapter 510 to be rotated while the second adapter 510 is engaged with the first adapter 505. The second adapter 510 can be received or inserted into the slot of the first adapter 505 when the actuator module 130 is a first positon (e.g., parallel to the ground and parallel to the side surface of the boot 110) at a first angle with respect to the first adapter 505. The actuator module 130 can be rotated from the first positon to a second positon (e.g., perpendicular to the ground and parallel to the side surface of the boot 110) at a second angle with respect to the first adapter 505 and with the second adapter 510 inserted into the first adapter 505. The first adapter 505 and the second adapter 510 can form a keyed joint when the actuator module 130 is at the second positon and at the second angle with respect to the first adapter 505.

The second adapter 510 can be connected to the end portion 512 of the post 150 through one or more fasteners 545. In some embodiments, the second adapter 510 can be bonded, molded or otherwise formed on the end portion 512 of the post 150 through one or more fasteners 545. The second adapter 510 can include keyed edge, keyed surface or shape to connect to the keyed first adapter 505. In embodiments, the actuator module 130 ca apply torque in a single direction preventing rotation between the first adapter 505 and the second adapter 510 when the actuator module 130 is locked in the second positon.

Figure 12:
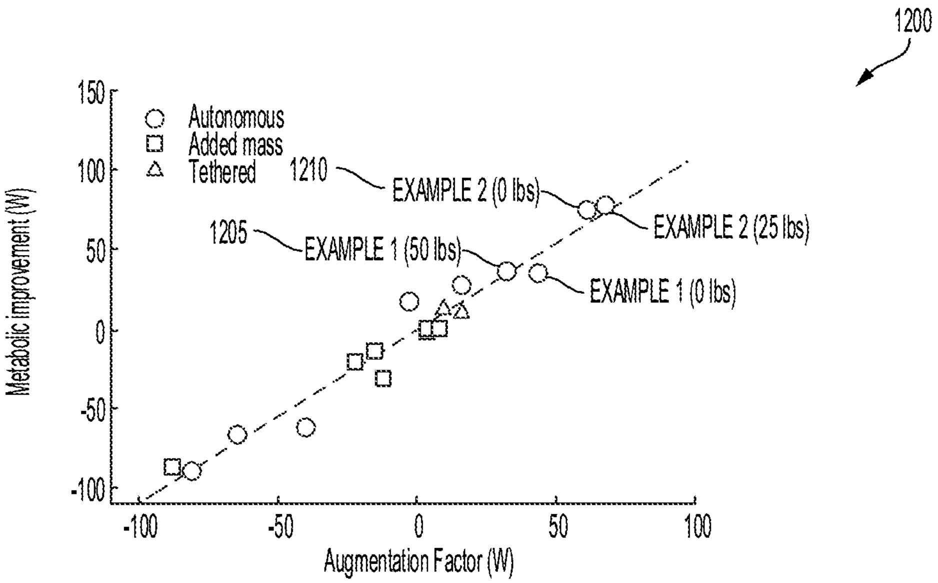
FIG. 12 illustrates a plot of metabolic improvement vs. augmentation factor.

FIG. 12 shows a graph 1200 of a comparison of metabolic improvement vs. augmentation factor using the exoskeleton devices 100 described here. In embodiments, the Augmentation Factor (AF) can be used to predict the capabilities of lower-limb exoskeletons 100. The AF can mathematically predict the metabolic effect of wearing an exoskeleton 100 by contrasting the benefits of positive mechanical exoskeletal power with the detriments of negative mechanical exoskeletal power and added carried structure weight. The AF can be used to develop and improve an autonomous exoskeleton 100 to reduce the metabolic cost of walking. In a first example embodiment 1205, the exoskeleton devices 100 can assist users' ankles during powered plantar flexion and remained transparent during swing. The lower limb exoskeleton 100 can significantly reduce metabolic demand by 8% and 10% for loaded (25 lbs) and unloaded walking, respectively. In FIG. 12, the results (e.g., a plot of metabolic improvement vs. augmentation factor) were obtained using systems of the present disclosure and those achieved in previous studies. Systems of the present disclosure can utilize the Augmentation Factor model to predict the metabolic effect of exoskeleton design decisions. The AF can be calculated for the example 2 exoskeleton 1210 and example 1 exoskeleton 1210 along with previously published exoskeletons that reported metabolic effect and mechanical power information. In some embodiments, the exoskeleton device 100 or system can use springs, damping elements, and actuators in various arrangements to augment ankles, knees and hips. In embodiments, wearing the exoskeleton device 100 on an instrumented treadmill can reduce the metabolic cost of unloaded walking by 21±3% compared to walking without the exoskeleton device 100 (3 mph, N=3). In some embodiments, the exoskeleton device may provide, for example, 22±3 W of electrical power per leg. In one embodiment, the exoskeleton device can include or use 1 kg of batteries to augment 15 km of walking. In some embodiments, for every 10 W of electrical power the exoskeleton device 100 can reduce the operator metabolic effort by approximately 17 W.

Assistive and/or performance augmenting devices such as the exoskeleton 100 can apply varying amounts of power, for example, a small amount of mechanical power, or a large amount based in part on the user and/or an activity to be performed. Applying more mechanical power may require more electrical power, and that correlates with more battery usage. The control system can estimate mechanical power, measure battery power, and optimize accordingly. The control system can increase power during demanding activities (e.g., loaded walking, running, up-hills, stairs, etc.). The control system can detect the onset of fatigue and increase power accordingly. The control system can apply enough power to compensate for the mass of the device during certain activities thus preserving battery energy for physically demanding activities. The control system can decrease power when battery charge state is low to extend range. The control system can allow user to select a power strategy (e.g., eco-mode with minimal assistance, balanced profile, or high-performance). If the controller is provided with data about future activity (e.g., 10 km walk and single set of batteries), the control system can use that data to provide the maximum amount of augmentation within the limits of the system. During team efforts, all of the strategy described above can be distributed. The batteries can be seen as a shared resource. A central controller can determine who should be receiving more power.

The system can influence user behavior and gait via control strategy. Exoskeleton controllers can be optimized for reduced metabolic cost of transportation. If the goal is something different than energy reduction, certain controller parameters can be changed. By changing the shape of the power profile, leading or lagging timing, adding resistance during certain gait phases, a controller can nudge a user into changing their behavior. For example, the controller can encourage shorter stride, encourage longer stride, encourage higher stride frequency, encourage higher walking speed, encourage lower ground force reaction and/or smoother motion, encourage mid/fore-foot striking instead of heel striking (jogging and running), and encourage better posture.

Lower limb exoskeletons 100 can aid in injury recovery. Lower limb exoskeletons 100 can increase healthy warfighter speed and endurance, predict and prevent injuries, enable warfighters to continue operation during recovery, measure injury recovery progress, and accelerate recovery. Lower limb exoskeletons 100 can be used to enable warfighters to continue operating while recovering from Achilles tendinopathy. Lower limb exoskeletons can increase warfighter speed and endurance while mitigating physiological impacts of load carriage. Lower limb exoskeletons 100 can be used in consumer, industrial, and medical applications. Soldier augmentation is achieved by assisting the soleus and gastrocnemius muscles with an external motor powered by batteries and controlled with artificial intelligence. Lower limb exoskeletons 100 can reduce the effort and loading on the biological muscles, tendons and joints.

Figure 13:
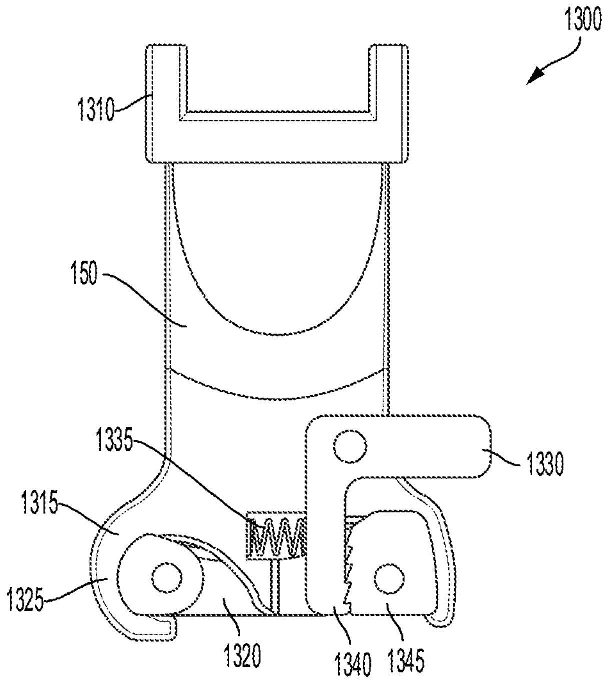
FIG. 13 illustrates a schematic diagram of a quick disconnect assembly in accordance with an illustrative embodiment.

FIG. 13 illustrates a quick disconnect assembly 1300. The quick disconnect assembly 1300 (or quick connection assembly) can incorporate features of or be implemented with various exoskeleton systems 100 described herein, such as to enable quicker connection and disconnection through a first adapter 505 of the footplate 115 and a second adapter 510 of the actuator module 130. In some embodiments, the quick disconnection assembly 1300 can work with or enable a one-handed connection or disconnection by a user, for example, using the quick disconnection mechanisms described above with respect to FIGS. 5 and 7-11.

The quick disconnect assembly 1300 can include a post 150. The post 150 can extend from a first end 1310 to a second 1315 that couples with an insert base 1320, which can be coupled with or integrally formed with the footplate 115. In embodiments, when in use, a first portion 1325 of the second end 1315 of the post 150 can be placed around the insert base 1320 (which may be oriented towards a rear side of a foot of the user), and the post 150 can be rotated (e.g., clockwise in the orientation depicted in FIG. 13) to secure the post 150 to the insert base 1320. For example, the quick disconnect assembly 1300 can include a lever 1330 that is rotatably coupled with the post 150 and in contact with a spring 1335. The lever 1330 can include a ratchet 1340 that engages a ratchet receiver 1345 of the insert base 1320. The ratchet receiver 1345 (e.g., cooperating with the spring 1335) can prevent rotation of the lever 1330 and the post 150 coupled with the lever 1330 (e.g., in a counter-clockwise direction in the orientation depicted in FIG. 13) to prevent removal of the post 150 from the insert base 1320. Responsive to rotation of the lever 1330 (e.g., in a clockwise direction in the orientation depicted in FIG. 13), the lever 1330 can disengage from the ratchet receiver 1345 to enable or allow removal of the post 150 from the insert base 1320. In embodiments, the quick disconnect assembly 1300 can enable secure engagement between the post 150 and the insert base 1300 while allowing for quick, one-handed removal of the post 150.

Figure 14:
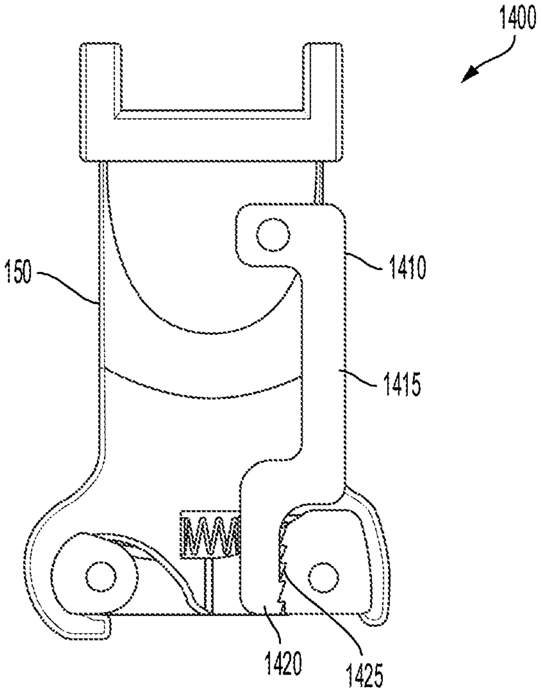
FIG. 14 illustrates a schematic diagram of a quick disconnect assembly in accordance with an illustrative embodiment.
Figure 15:
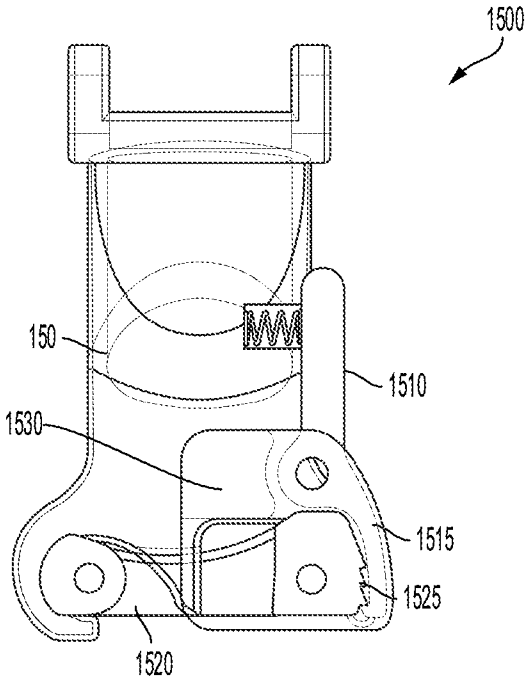
FIG. 15 illustrates a schematic diagram of a quick disconnect assembly in accordance with an illustrative embodiment.

FIG. 14 illustrates a quick disconnect assembly 1400. In embodiments, the quick disconnect assembly 1400 of FIG. 14 can be similar to the quick disconnect assembly 1300 of FIG. 13 and incorporate features of the quick disconnect assembly 1300. The quick disconnect assembly 1400 can include a post 150 and a lever 1410 coupled with the post 150. The lever 1410 can include a first portion 1415 coupled with a second portion 1420 defining a ratchet 1425. The first portion 1415 can extend along a length of the post 150 to the second portion 1420, which can reduce the likelihood of inadvertent movement of the lever 1410 (and thus reduce the likelihood of inadvertent disconnection of the post 150). FIG. 15 illustrates a quick disconnect assembly 1500. In embodiments, the quick disconnect assembly 1500 of FIG. 15 can be similar to the quick disconnect assembly 1300 of FIG. 13 and to the quick disconnect assembly 1400 of FIG. 14 and incorporate features of the both the quick disconnect assembly 1300 and the quick disconnect assembly 1400. In embodiments, the quick disconnect assembly 1500 can include a post 150 and a lever 1510 coupled with the post 150. The lever 1510 can include a ratchet 1515 that engages an outer ratchet receiver 1525 of an insert base 1520. The quick disconnect assembly 1500 can include a cover 1530 that at least partially covers the lever 1510 and ratchet receiver 1525 to prevent inadvertent movement of the lever 1510.

Figure 16:
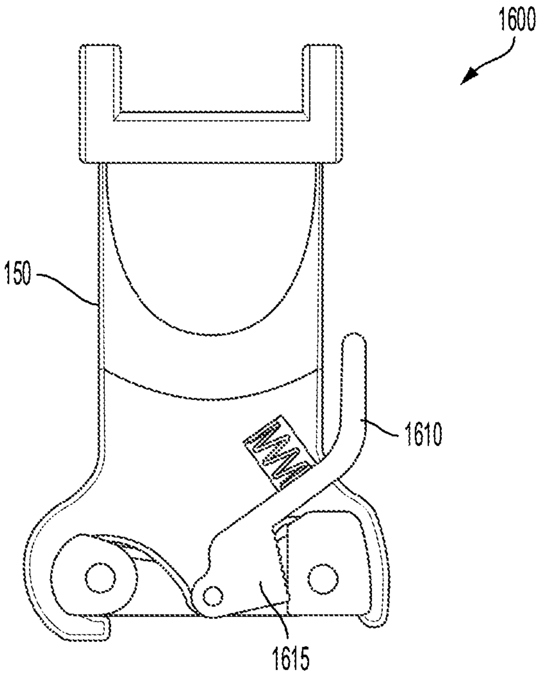
FIG. 16 illustrates a schematic diagram of a quick disconnect assembly in accordance with an illustrative embodiment.
Figure 17:
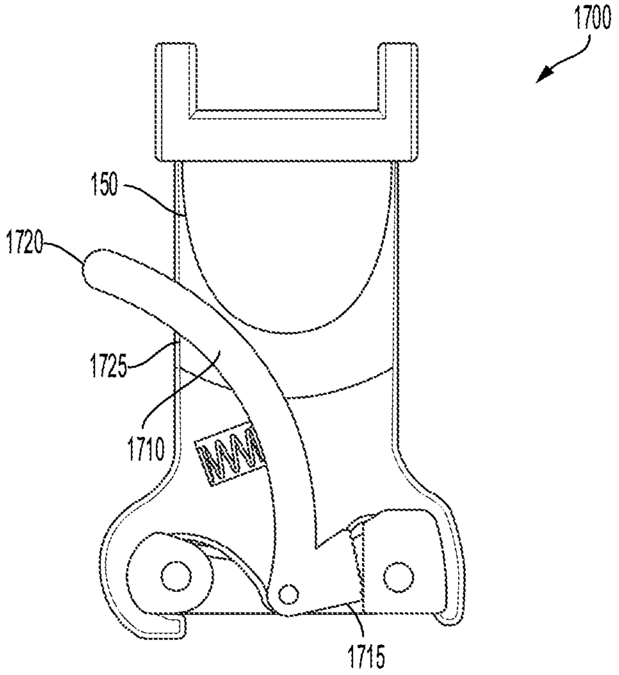
FIG. 17 illustrates a schematic diagram of a quick disconnect assembly in accordance with an illustrative embodiment.

FIG. 16 illustrates a quick disconnect assembly 1600. In embodiments, the quick disconnect assembly 1600 of FIG. 16 can be similar to the quick disconnect assembly 1300 of FIG. 13, the quick disconnect assembly 1400 of FIG. 14 and the quick disconnect assembly 1500 of FIG. 15 and incorporate features of the both the quick disconnect assembly 1300, the quick disconnect assembly 1400 and the quick disconnect assembly 1500. The quick disconnect assembly 1600 can include a post 150 and a lever 1610 coupled with the post 150. The lever 1610 can include a cam portion 1615 (e.g., a portion in which a radius to an edge of the cam portion 1615 varies relative to an axis of rotation of the lever 1610), which can facilitate improved engagement of the lever 1610 with the post 150. FIG. 17 illustrates a quick disconnect assembly 1700. In embodiments, the quick disconnect assembly 1700 of FIG. 17 can be similar to the quick disconnect assembly 1300 of FIG. 13, the quick disconnect assembly 1400 of FIG. 14, the quick disconnect assembly 1500 of FIG. 15 and the quick disconnect assembly 1600 of FIG. 16 and incorporate features of the both the quick disconnect assembly 1300, the quick disconnect assembly 1400, the quick disconnect assembly 1500 and the quick disconnect assembly 1600 of FIG. 16. The quick disconnect assembly 1700 includes a post 150 and a lever 1710 coupled with the post 150. The lever 1710 can include a cam portion 1715 (e.g., a portion in which a radius to an edge of the cam portion 1715 varies relative to an axis of rotation of the lever 2610), which can facilitate improved engagement of the lever 1710 with the post 150. The lever 1710 can include a handle portion 1720 that extends past a side 1725 of the post 150 (e.g., a side that may be oriented towards a rear side of a foot of a user).

Figure 18:
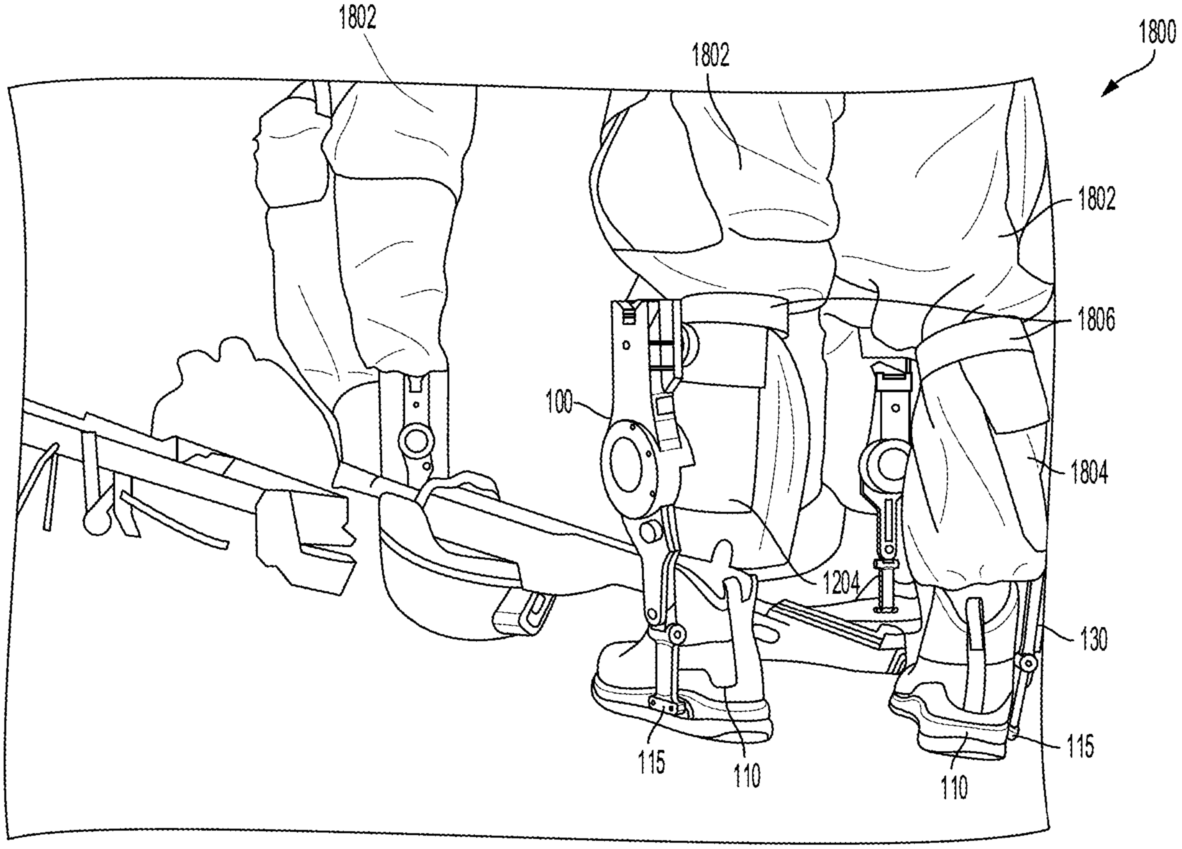
FIG. 18 illustrates a lower limb exoskeleton worn by soldiers in accordance with an illustrative embodiment.

FIG. 18 illustrates a lower limb exoskeleton devices 100 worn by a group of users 1802, here soldiers in a group or platoon. The exoskeleton devices 100 can include a strap 1806 that connects to the shin pad 125 of the exoskeleton device 100 and wraps around the users leg to connect the exoskeleton device 100 to a portion 1804 (e.g., just below the knee) of the leg of the user 1802. The actuator module 130 can be aligned with, contacting or parallel with the portion 1804 of the leg the user 1802 when the user 1802 is wearing the exoskeleton device 100 during one or more movements. The actuator module 130 can connect to the footplate 115 that is disposed within or inserted into a portion (e.g., sole) of the boot 110 worn by the users 1802. In embodiments, the exoskeleton devices can maximize exoskeleton power output and comfort while minimizing exoskeletal mass, used battery energy, training time and donning/doffing time. For example, the quick disconnection mechanisms described herein can enable the users 1802 to connect or disconnect the actuator module 130 and exoskeleton devices 100 in fast or efficient manner in response to various environmental conditions. In some embodiments, noise and efficiency are can be features of commercial exoskeleton devices 100. The exoskeleton devices 100 can include or be developed with electric actuators and passive energy storage components as opposed to hydraulic or pneumatic approaches. For example, electrical systems can be more efficient and may not use or include noisy pumps, compressors or valves. In embodiments, the exoskeleton devices 100 can include motors capable of low speeds and high torques to match the kinematics and kinetics of the human body. Increasing the motor torque can reduce a dimension of the transmission ratio, which can reduce size, mass, part-count and noise while increasing efficiency. In some embodiments, the exoskeleton devices can include custom motors integrated with large diameters, short lengths and a high number of magnetic poles, which can increase specific torque by an order of magnitude.

In some embodiments, the exoskeleton devices 100 can include unidirectional actuators to enable or allow the exoskeleton devices 100 to assist the user 1802 (e.g., operator) during times of human inefficiency, and then exhibit zero-torque control when the user 1802 (e.g., operator) does not require assistance. The lightweight design of the foot-ankle exoskeleton device 100 can be provide a comfortable option for footwear and may not be a burden to the user 1802 even when the motor is unpowered. In embodiments, wearing an unpowered exoskeleton device 100 can result in a non-significant 0.5% increase in metabolic expenditure compared to normal boots or footwear. The exoskeleton devices 100 can include an ankle-foot exoskeleton controller configured to train or learn tendencies and patterns of the user 1802 during an initial period of true zero-torque control. In one embodiment, during a training period (e.g., 30 seconds of automatic controller training), the controller of the exoskeleton device 100 can collect and/or determine kinematic and temporal features across a range of gait speeds. After completing the training period, the controller can develop and/or learn a user-specific biomechanical gait model for the user 1802 that informs exoskeleton control. In embodiments, the controller of the exoskeleton device 100 can recue or eliminate the use of traditional tuning parameters as the controller learns and generates a user-specific biomechanical gait model for the user 1802. In some embodiments, the exoskeleton device 100 can include a Bluetooth connection, for example, to connect to a Bluetooth communication platform and enable researchers, developers and users 1802 to wirelessly control parameters and record sensor data for the exoskeleton device 100. The communication application can be available on any computing device as described herein, including but not limited to, desktop computers, laptops and tablets.

Joint augmentation exoskeletons 100 have the potential to reduce joint loading by reducing internal muscle forces. Developers of military exoskeletons have attempted to offload soldiers by building full-body exoskeletons that transferred the load of a backpack through an exoskeletal structure into the ground. However, load on human joints can be both a function of payload and the joint torque required to walk or run with such a payload. During intense activities, such as jumping or running, peak torques at the ankle and knee can exceed well over 250 Nm. Conservative estimates for the moment-arm lengths of the ankle and knee can include 0.025 m and 0.040 m. This may result in joint forces of 10,000 N (2248 lbs.) at the ankle and 6,250 N (1405 lbs.) at the knee. Furthermore, muscles may co-contract to increase joint stability which may significantly increase joint loading. The loads on joints exerted by muscles may be significant when compared to the weight of the human body. An exoskeleton 100 that reduces biological joint torques, and thus muscle forces, may also reduce joint loading.

Figure 19:
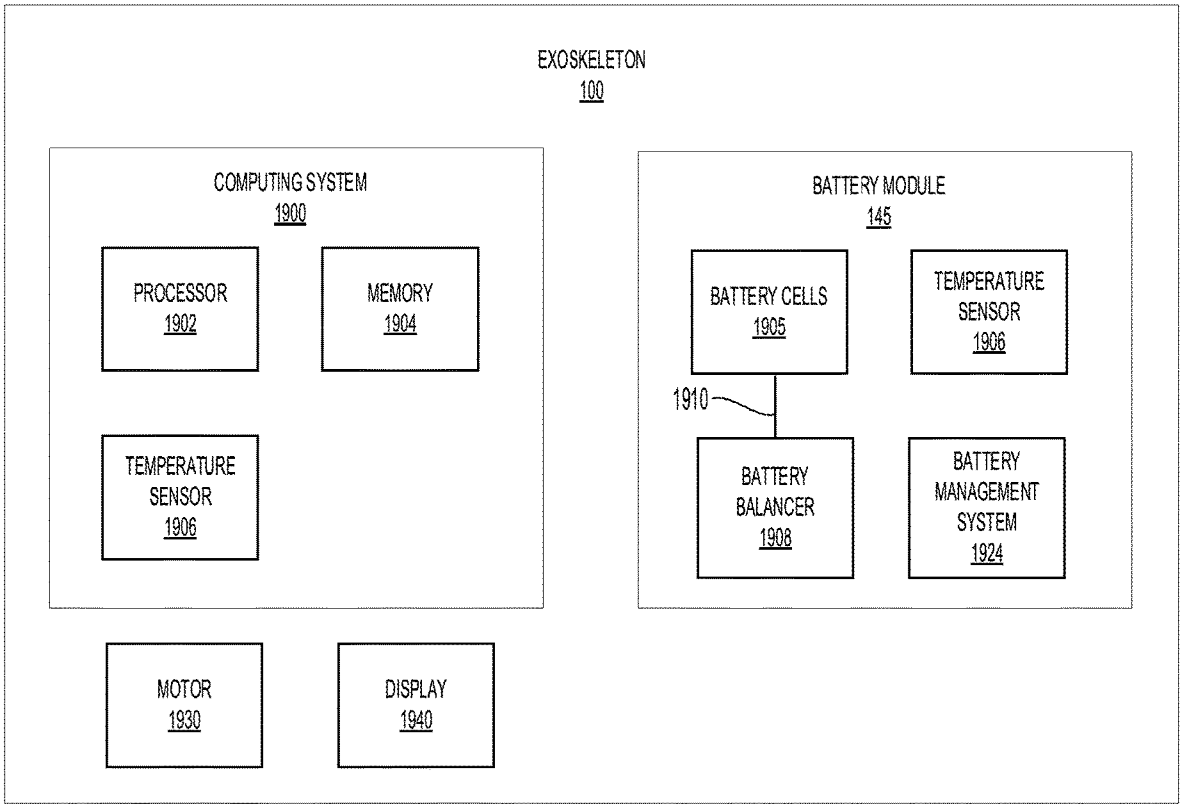
FIG. 19 illustrates a schematic diagram of an exoskeleton, according to an embodiment.

FIG. 19 illustrates a schematic diagram of an exoskeleton 100. The exoskeleton 100 can include a motor 1930. The motor 1930 can generate torque about an axis of rotation of an ankle joint of the user. The exoskeleton 100 can include the battery module 145. The exoskeleton 100 can include a computing system 1900. The exoskeleton 100 can include one or more processors 1902, memory 1904, and one or more temperature sensors 1906 (e.g., thermocouples). The one or more processors 1902, memory 1904, and one or more temperature sensors 1906 can be located within the computing system 1900. In some cases, the computing system 1900 can include the batter balancer 1908 as opposed to the battery module 145.

The one or more processors 1902 can receive data corresponding to a performance of the battery module 145. The data can include one or more of a temperature, current, voltage, battery percentage, internal state or firmware version. The one or more processors 1902 can determine, based on a safety policy, to trigger a safety action. The safety policy can include triggering the safety action if a threshold temperature, voltage or battery percentage is crossed. For example, the safety policy can include triggering the safety action if a temperature of one or more of the plurality of battery cells 1905 is higher than a threshold temperature. The safety policy can include triggering the safety action if a battery percentage of the battery module 145 is below a threshold battery percentage. The safety policy can include triggering the safety action if a measured temperature is higher than the threshold temperature. The measured temperature can include the temperature of the printed circuit board and battery cells 1905. The measured temperature can include the temperature of the printed circuit board and battery cells 1905 measured in two locations. The safety policy can include triggering the safety action if a measured voltage is higher than the threshold voltage.

The one or more processors 1902 can instruct, based on the safety action, the electronic circuitry to adjust delivery of power from the battery module 145 to the electric motor to reduce an amount of torque generated about the axis of rotation of the ankle joint of the user. The safety action can include lowering or reducing the amount of torque generated about the axis of rotation of the ankle joint of the user. The safety action can include increasing the amount of torque generated about the axis of rotation of the ankle joint of the user. The one or more temperature sensors 1906 can be placed between the plurality of battery cells 1905 to provide an indication of a temperature between the plurality of battery cells 1905. A temperature sensor of the one or more temperature sensors 1906 can be mounted on the printed circuit board to measure a temperature of the printed circuit board. The electronic circuitry (e.g., computer system 1900) can control the delivery of power from the battery module 145 to the electric motor based at least in part on the indication of the temperature between the plurality of battery cells 1905 or the temperature of the printed circuit board. The one or more battery balancers 1908 can be configured to actively transfer energy from a first battery cell 1905 of the plurality of battery cells 1905 to a second battery cell 1905 of the plurality of battery cells 1905 having less charge than the first battery cell 1905. A signal trace 1910 can electrically connect the plurality of battery cells 1905 to the one or more battery balancers 1908. The signal trace 1910 can be located on the printed circuit board.

The exoskeleton 100 can include the battery module 145. The battery module 145 can include a plurality of battery cells 1905, one or more temperature sensors 1906, one or more battery balancers 1908, and a battery management system 1924. The battery management system 1924 can perform various operations. For example, the battery management system 1924 can optimize the energy density of the unit, optimize the longevity of the cells 1905, and enforce the required safety to protect the user. The battery management system 1924 can go into ship mode by electrically disconnecting the battery module 145 from the rest of the system to minimize power drain while the system is idle. The battery management system 1924 can go into ship mode if a major fault is detected. For example, if one or more of the plurality of battery cells 1905 self-discharge at a rate higher than a threshold, the battery management system 1924 can re-enable the charging port. While these components are shown as part of the exoskeleton 100, they can be located in other locations such as external to the exoskeleton 100. For example, the battery management system 1924 or the computing system 1900 can be located external to the exoskeleton 100 for testing purposes.

In embodiments, the data processing system, computer system 1900 or computing device can be used to implement one or more components configured to process data or signals depicted in FIGS. 1-18. The computing system 1900 includes a bus or other communication component for communicating information and the processor 1902 or processing circuit coupled to the bus for processing information. The computing system 1900 also includes main memory 1904, such as a random access memory (RAM) or other dynamic storage device, coupled to the bus for storing information, and instructions to be executed by the processor 1902. Main memory 1904 can also be used for storing time gating function data, temporal windows, images, reports, executable code, temporary variables, or other intermediate information during execution of instructions by the processor 1902. The computing system 1900 may further include a read only memory (ROM) 1904 or other static storage device coupled to the bus for storing static information and instructions for the processor 1902. The memory 1904 can include a storage device, such as a solid state device, magnetic disk or optical disk, is coupled to the bus for persistently storing information and instructions.

The computing system 1900 may be coupled via the bus to a display 1940 or display device, such as a liquid crystal display, or active matrix display, for displaying information to a user. An input device, such as a keyboard including alphanumeric and other keys, may be coupled to the bus for communicating information and command selections to the processor 1902. The input device can include a touch screen display 1940. The input device can also include a cursor control, such as a mouse, a trackball, or cursor direction keys, for communicating direction information and command selections to the processor 1902 and for controlling cursor movement on the display 1940.

The processes, systems and methods described herein can be implemented by the computing system 1900 in response to the processor 1902 executing an arrangement of instructions contained in main memory 1904. Such instructions can be read into main memory 1904 from another computer-readable medium, such as the storage device. Execution of the arrangement of instructions contained in main memory 1904 causes the computing system 1900 to perform the illustrative processes described herein. One or more processors in a multi-processing arrangement may also be employed to execute the instructions contained in main memory 1904. In some embodiments, hard-wired circuitry may be used in place of or in combination with software instructions to effect illustrative implementations. Thus, embodiments are not limited to any specific combination of hardware circuitry and software.

Although an example computing system has been described in FIG. 19, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An apparatus to augment motion of a user, comprising:
- a foot plate disposed within a boot of the user;
- a first adapter extending from a side surface of the foot plate, the first adapter including a slot exposed towards an external portion of the boot;
- a shin pad configured to couple with a shin of the user;
- an actuator module comprising:
  - at least one housing of one or more housings to couple with the shin pad, the one or more housings enclosing electronic circuitry and an electric motor configured to generate torque about an axis of rotation of an ankle joint of the user;
  - a chassis coupled to the shin pad through a housing of the one or more housings;
  - a post coupled to the chassis; and
  - a second adapter extending from an end surface of the post; and
- the slot of the first adapter to:
  - receive the second adapter of the actuator module upon insertion of the second adapter into the slot, wherein the second adapter and the post are at a first angle relative to the first adapter; and
  - lock the second adapter upon rotation of the second adapter and the post from the first angle to a second angle relative to the first adapter to configure the actuator module to generate torque about the axis of rotation of the ankle joint of the user.

2. The apparatus of claim 1, wherein the actuator module provides a force at a first level to the first adapter and the second adapter when the actuator module is positioned at the first angle relative to the first adapter and the actuator module provides a force at a second level to the first adapter and the second adapter when the actuator module is positioned at the second angle relative to the first adapter, the second level different from the first level.

3. The apparatus of claim 1, wherein the first adapter and the second adapter form a keyed joint when the actuator module is positioned at the second angle relative to the first adapter.

4. The apparatus of claim 1, comprising:
- the slot of the first adapter includes a first portion having a first shape, the first shape having the same shape as a shape of the second adapter; and the slot of the first adapter includes a second portion having a second shape, different from the first shape of the first portion.

5. The apparatus of claim 1, comprising:

the slot of the first adapter includes a first portion having a first set of dimensions; and the slot of the first adapter includes a second portion having a second set of dimensions, the second set of dimensions different from the first set of dimensions.

6. The apparatus of claim 1, comprising:

a support plate coupling the first adapter to the foot plate through one or more fasteners.

7. The apparatus of claim 1, comprising:

a shin lever extending from the at least one housing to the shin pad to connect the shin pad to the chassis.

8. The apparatus of claim 1, comprising:

the foot plate including a carbon structure disposed within a sole of the boot of the user.

9. The apparatus of claim 1, comprising:

a battery holder coupled to the shin pad, the battery holder located above the one or more housings enclosing the electronic circuitry;

a battery module held in the battery holder, the battery module to provide electric power to the electronic circuitry and the electric motor;

wherein the electronic circuitry controls delivery of power from the battery module to the electric motor to configure the actuator module to generate torque about the axis of rotation of the ankle joint of the user.

10. The apparatus of claim 9, comprising:

a first rotary encoder enclosed within the one or more housings and configured to measure an angle of the electric motor, and wherein the electronic circuitry receives, from the first rotary encoder, an indication of the angle of the electric motor and controls, based on the indication of the angle of the electric motor, operation of the electric motor to configure the actuator module to generate torque about the axis of rotation of the ankle joint of the user.

11. The apparatus of claim 10, comprising:

a second rotary encoder configured to measure an angle of the ankle joint, the second rotary encoder comprising a first component enclosed in the one or more housings and in communication with the electronic circuitry, and a second component located outside the one or more housings and configured to interact with the first component;

the first component of the second rotary encoder comprises a sensor, the second component of the second rotary encoder comprises a magnetic component, and the electronic circuitry configured to determines the angle of the ankle joint based on an interaction between the sensor and the magnetic component.

12. A method to augment motion of a user, comprising:

disposing a foot plate within a boot of the user;

connecting a first adapter to a side surface of the foot plate, the first adapter including a slot exposed towards an external portion of the boot;

providing a shin pad configured to couple with a shin of the user;

coupling at least one housing of one or more housings with the shin pad;

enclosing electronic circuitry and an electric motor within the one or more housings, wherein the electronic circuitry and the electric motor are configured to generate torque about an axis of rotation of an ankle joint of the user;

forming a second adapter from an end surface of a post; and connecting a chassis to the post to form an actuator module;

wherein the slot of the first adapter is configured to:

receive the second adapter of the actuator module upon insertion of the second adapter into the slot, wherein the second adapter and the post are at a first angle relative to the first adapter; and lock the second adapter upon rotation of the second adapter and the post from the first angle to a second angle relative to the first adapter to configure the actuator module to generate torque about the axis of rotation of the ankle joint of the user.

13. The method of claim 12, comprising:

providing, by the actuator module, a force at a first level to the first adapter and the second adapter when the actuator module is positioned at the first angle relative to the first adapter; and providing, by the actuator module responsive to the rotation, a force at a second level to the first adapter and the second adapter when the actuator module is positioned at the second angle relative to the first adapter, the second level different from the first level.

14. The method of claim 12, comprising forming a keyed joint between the first adapter and the second adapter when the actuator module is positioned at the second angle relative to the first adapter.

15. The method of claim 12, comprising:

forming a first portion of the slot of the first adapter having a first shape, the first shape having the same shape as a shape of the second adapter; and forming a second portion of the slot of the first adapter having a second shape, different from the first shape of the first portion.

16. The method of claim 12, comprising:

forming a first portion of the slot of the first adapter having a first set of dimensions; and forming a second portion of the slot of the first adapter having a second set of dimensions, the second set of dimensions different from the first set of dimensions.

17. The method of claim 12, comprising coupling, through a support plate, the first adapter to the foot plate through one or more fasteners.

18. The method of claim 12, comprising:

connecting, through a shin lever, the shin pad to the chassis, the shin lever extending from the at least one housing to the shin pad.

19. The method of claim 12, comprising:

coupling a battery holder to the shin pad, the battery holder located above the one or more housings enclosing the electronic circuitry;

disposing a battery module in the battery holder, the battery module to provide electric power to the electronic circuitry and the electric motor; and wherein the electronic circuitry controls delivery of power from the battery module to the electric motor to configure the actuator module to generate torque about the axis of rotation of the ankle joint of the user.

20. The method of claim 19, comprising:

enclosing a rotary encoder within the one or more housings to measure an angle of the electric motor, and wherein the electronic circuitry receives, from the rotary encoder, an indication of the angle of the electric motor and controls, based on the indication of the angle of the electric motor, operation of the electric motor to configure the actuator module to generate torque about the axis of rotation of the ankle joint of the user.

* * * * *